(12) United States Patent
Behling et al.

(10) Patent No.: US 11,725,308 B2
(45) Date of Patent: Aug. 15, 2023

(54) CORE-SHEATH FILAMENTS INCLUDING CROSSLINKABLE AND CROSSLINKED ADHESIVE COMPOSITIONS AND METHODS OF MAKING THE SAME

(71) Applicant: 3M INNOVATIVE PROPERTIES COMPANY, St. Paul, MN (US)

(72) Inventors: Ross E. Behling, Woodbury, MN (US); Thomas Q. Chastek, St. Paul, MN (US); Mark E. Napierala, St. Paul, MN (US); Alexander J. Kugel, Woodbury, MN (US); Shaun M. West, St. Paul, MN (US); Robert D. Waid, Maplewood, MN (US); Jacob D. Young, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/632,771

(22) PCT Filed: Aug. 12, 2020

(86) PCT No.: PCT/IB2020/057595
§ 371 (c)(1),
(2) Date: Feb. 3, 2022

(87) PCT Pub. No.: WO2021/033084
PCT Pub. Date: Feb. 25, 2021

(65) Prior Publication Data
US 2022/0290335 A1 Sep. 15, 2022

Related U.S. Application Data

(60) Provisional application No. 62/888,913, filed on Aug. 19, 2019.

(51) Int. Cl.
*B33Y 70/00* (2020.01)
*D01F 8/10* (2006.01)
(Continued)

(52) U.S. Cl.
CPC ............. *D01F 8/10* (2013.01); *B29C 64/118* (2017.08); *B33Y 70/00* (2014.12); *C09J 133/10* (2013.01);
(Continued)

(58) Field of Classification Search
CPC .................................. D01F 8/10; B33Y 70/00
See application file for complete search history.

(56) References Cited

U.S. PATENT DOCUMENTS 3,469,363 A 9/1969 Berckmoes
4,452,955 A 6/1984 Boeder
(Continued)

FOREIGN PATENT DOCUMENTS

CN 105536051 8/2018
DE 3625358 6/1989
(Continued)

OTHER PUBLICATIONS

3M Scotchkote™ Infrastructure Protection Products, "Protection You Can Count on: Scotchkote Fusion Bonded Epoxy Coatings," 2013, 15 pages.
(Continued)

*Primary Examiner* — Nicholas R Krasnow

(57) ABSTRACT

A core-sheath filament including a crosslinkable adhesive core that can be cured using ultraviolet or visible light radiation. These crosslinkable adhesive core compositions can provide very high bond strength and are capable of replacing traditional mechanical fasteners in many industrial applications. Core-sheath filaments including such crosslinkable compositions, crosslinked compositions, articles
(Continued)

containing these compositions, and methods of making the articles are provided. The crosslinkable compositions contain pendant aromatic ketone groups or pendant (meth) acryloyl groups that, upon exposure to ultraviolet radiation, result in the formation of crosslinks within the polymeric material. The crosslinked compositions can function as pressure-sensitive adhesives.

7 Claims, 1 Drawing Sheet

(51) Int. Cl.
  *B29C 64/118* (2017.01)
  *C09J 133/10* (2006.01)
  *B29K 33/00* (2006.01)
  *B29K 105/00* (2006.01)
  *B29K 105/24* (2006.01)
(52) U.S. Cl.
  CPC .. *B29K 2033/12* (2013.01); *B29K 2105/0097* (2013.01); *B29K 2105/24* (2013.01); *B29K 2105/258* (2013.01)

(56) References Cited

U.S. PATENT DOCUMENTS

| | | | |
|---|---|---|---|
| 4,490,424 A | 12/1984 | Gerace | |
| 4,619,979 A | 10/1986 | Kotnour | |
| 4,843,134 A | 6/1989 | Kotnour | |
| 4,912,169 A | 3/1990 | Whitmire | |
| 5,257,491 A | 11/1993 | Rouyer | |
| 5,387,623 A | 2/1995 | Ryan | |
| 5,637,646 A | 6/1997 | Ellis | |
| 5,669,207 A | 9/1997 | Hull | |
| 5,721,289 A | 2/1998 | Karim | |
| 5,804,610 A | 9/1998 | Hamer | |
| 5,986,011 A | 11/1999 | Ellis | |
| 6,138,441 A | 10/2000 | Kik | |
| 6,274,643 B1 | 8/2001 | Karim | |
| 6,448,339 B1 | 9/2002 | Tomita | |
| 6,537,659 B2 | 3/2003 | Karim | |
| 6,783,850 B2 | 8/2004 | Takizawa | |
| 6,939,911 B2 | 9/2005 | Tosaki | |
| 7,328,547 B2 | 2/2008 | Mehta | |
| 7,773,834 B2 | 8/2010 | Ouderkirk | |
| 7,838,110 B2 | 11/2010 | Zhu | |
| 9,193,110 B2 | 11/2015 | Pridoehl | |
| 9,878,515 B2 | 1/2018 | Remmers | |
| 10,189,771 B2 | 1/2019 | Benson | |
| 2006/0099338 A1 | 5/2006 | Boelz | |
| 2013/0184394 A1 | 7/2013 | Satrijo | |
| 2014/0011912 A1 | 1/2014 | Petry | |
| 2014/0357145 A1 | 12/2014 | Remmers | |
| 2015/0165670 A1 | 6/2015 | Hebert | |
| 2016/0159009 A1* | 6/2016 | Canale | B33Y 70/00 522/111 |
| 2021/0114276 A1* | 4/2021 | Nelson | B29C 48/912 |

FOREIGN PATENT DOCUMENTS

| | | |
|---|---|---|
| WO | 1993-023224 | 11/1993 |
| WO | 1999-028539 | 6/1999 |
| WO | 2002-090628 | 11/2002 |
| WO | 2011-119363 | 9/2011 |
| WO | 2016-090164 | 6/2016 |
| WO | 2017-009190 | 1/2017 |
| WO | 2017-058499 | 4/2017 |
| WO | 2018-199959 | 11/2018 |
| WO | 2019-164678 | 8/2019 |
| WO | 2020-003123 | 1/2020 |
| WO | 2020-174394 | 9/2020 |

OTHER PUBLICATIONS

Turner, "A Review of Melt Extrusion Additive Manufacturing Processes: I. Process Design and Modeling," Rapid Prototyping Journal, 2014, vol. 20, No. 3, pp. 192-204.

International Search Report for PCT International Application No. PCT/IB2020/057595, dated Nov. 13, 2020, 5 pages.

* cited by examiner

CORE-SHEATH FILAMENTS INCLUDING CROSSLINKABLE AND CROSSLINKED ADHESIVE COMPOSITIONS AND METHODS OF MAKING THE SAME

CROSS REFERENCE TO RELATED APPLICATIONS

This application is a national stage filing under 35 U.S.C. § 371 of PCT/IB2020/057595, filed Aug. 12, 2020, which claims the benefit of Provisional Application No. 62/888,913, filed Aug. 19, 2019, the disclosure of which is incorporated by reference in its/their entirety herein.

TECHNICAL FIELD

The present disclosure broadly relates to core-sheath filaments including crosslinkable adhesive cores and non-tacky sheaths, articles containing these compositions, and methods of making the articles are described.

BACKGROUND

The use of fused filament fabrication ("FFF") to produce three-dimensional articles has been known for a relatively long time, and these processes are generally known as methods of so-called 3D printing (or additive manufacturing). In FFF, a plastic filament is melted in a moving printhead to form a printed article in a layer-by-layer, additive manner. The filaments are often composed of polylactic acid, nylon, polyethylene terephthalate (typically glycol-modified), or acrylonitrile butadiene styrene.

(Meth)acrylate-based pressure-sensitive adhesives have been used in various applications.

SUMMARY

Provided herein are core-sheath filaments including a crosslinkable adhesive composition in the core that can be cured using ultraviolet or visible light radiation. The crosslinkable adhesive composition has desirable flow characteristics for use in a variety of applications. Core-sheath filaments including such crosslinkable compositions, crosslinked compositions, articles containing these compositions, and methods of making the articles are provided. The crosslinkable compositions contain pendant aromatic ketone groups or pendant (meth)acryloyl groups that, upon exposure to ultraviolet radiation, result in the formation of crosslinks within the polymeric material. The crosslinked compositions can function as pressure-sensitive adhesives.

In a first aspect, provided is A core-sheath filament comprising:
a non-tacky sheath, wherein the non-tacky sheath exhibits a melt flow index of less than 15 grams per 10 minutes (g/10 min); and
a curable adhesive composition comprising (1) a curable (meth)acrylate copolymer having a weight average molecular weight in a range of 100,000 to 1,500,000 Da and (2) an optional photoinitiator, wherein the curable (meth)acrylate copolymer comprises:
a) a first monomeric unit of Formula (I) in an amount in a range of 50 to 99 weight percent based on a total weight of monomeric units in the curable (meth)acrylate copolymer

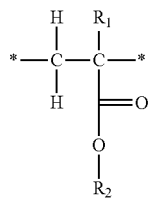

wherein
$R_1$ is hydrogen or methyl; and
$R_2$ is an alkyl, heteroalkyl, aryl, aralkyl, or alkaryl group;
b) a second monomeric unit of Formula (II) in an amount in a range of 1 to 13 weight percent based on the total weight of monomeric units in the curable (meth)acrylate copolymer

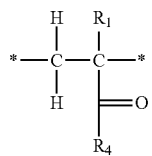

wherein
$R_1$ is hydrogen or methyl; and
$R_4$ is —OH, —NH$_2$, a secondary amino group, a tertiary amino group, an (N,N-dialkylaminoalkyl)-O— group, (N,N-dialkylaminoalkyl)-N— group; and
c) a third monomeric unit of Formula (III) in an amount in a range of 0.05 to 5 weight percent based on the total weight of monomeric units of the curable (meth)acrylate copolymer

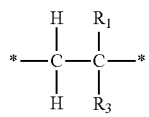

wherein
$R_3$ comprises 1) an aromatic ketone group that causes hydrogen abstraction from a polymeric chain when exposed to ultraviolet radiation or 2) a (meth)acryloyl group that undergoes free radical polymerization in the presence of the photoinitiator when exposed to ultraviolet or visible light radiation.

In another aspect, provided is a cured adhesive composition comprising the disclosed core-sheath filament, the cured adhesive composition being a reaction product resulting from exposing the core-sheath filament to ultraviolet or visible light radiation after compounding the core-sheath filament through a heated extruder nozzle.

In another aspect provided is method of making a core-sheath filament, the method comprising:
a) forming a core composition comprising the disclosed curable adhesive composition;
b) forming a sheath composition comprising a non-tacky thermoplastic material; and c) wrapping the sheath composition around the core composition the core-sheath filament, wherein the core-sheath filament has an average longest cross-sectional distance in a range of 1 to 20 millimeters.

The above summary of the present disclosure is not intended to describe each disclosed embodiment or every implementation of the present disclosure. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

Figure 1:
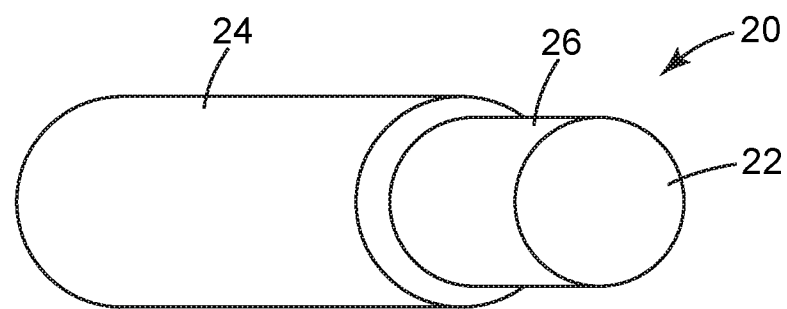
FIG. 1 is a schematic perspective exploded view of a section of a core-sheath filament, according to an embodiment of the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

A core-sheath filament including a crosslinkable adhesive core that can be cured using ultraviolet or visible light radiation is provided. These crosslinkable adhesive core compositions can provide very high bond strength and are capable of replacing traditional mechanical fasteners in many industrial applications. Manufacturers also appreciate these bonding solutions because they are economical and easy to use. Core-sheath filaments including such crosslinkable compositions, crosslinked compositions, articles containing these compositions, and methods of making the articles are provided. The crosslinkable compositions contain pendant aromatic ketone groups or pendant (meth) acryloyl groups that, upon exposure to ultraviolet radiation, result in the formation of crosslinks within the polymeric material. The crosslinked compositions can function as pressure-sensitive adhesives.

Adhesive transfer tapes have been used extensively for adhering a first substrate to a second substrate. Adhesive transfer tapes are typically provided in rolls and contain a pressure-sensitive adhesive layer positioned on a release liner or between two release liners, and because transfer adhesive tapes often need to be die-cut to the desired size and shape prior to application to a substrate, the transfer adhesive tape that is outside the die-cut area is discarded as waste. The core-sheath filaments described herein can be used to deliver a pressure-sensitive adhesive (also referred to herein as a "hot-melt processable adhesive") without the use of a release liner and with less waste. The non-tacky sheath allows for easy handling of the hot-melt processable adhesive before deposition on a substrate. Furthermore, the use of the core-sheath filaments described herein as the adhesive composition can substantially reduce the waste often associated with adhesive transfer tapes as no die-cutting is required because the adhesive is deposited only in the desired area.

The disclosed core-sheath filaments can be used for printing a hot-melt processable adhesive using fused filament fabrication ("FFF"). The material properties needed for FFF dispensing typically are significantly different than those required for hot-melt dispensing of a pressure-sensitive adhesive composition. For instance, in the case of traditional hot-melt adhesive dispensing, the adhesive is melted into a liquid inside a tank and pumped out through a hose and nozzle. Thus, traditional hot-melt adhesive dispensing requires a low-melt viscosity adhesive, which is often quantified as a high melt flow index ("MFI") adhesive. If the viscosity is too high (or the MFI is too low), the hot-melt adhesive cannot be effectively transported from the tank to the nozzle. In contrast, FFF involves melting a filament only within a nozzle at the point of dispensing, and therefore is not limited to low melt viscosity adhesives (high melt flow index adhesives) that can be easily pumped. In fact, a high melt viscosity adhesive (a low melt flow index adhesive) can advantageously provide geometric stability of a hot-melt processable adhesive after dispensing, which allows for precise and controlled placement of the adhesive as the adhesive does not spread excessively after being printed.

In addition, suitable filaments for FFF typically need at least a certain minimum tensile strength so that large spools of filament can be continuously fed to a nozzle without breaking. The FFF filaments are usually spooled into level wound rolls. When filaments are spooled into level wound rolls, the material nearest the center can be subjected to high compressive forces. Preferably, the core-sheath filament is resistant to permanent cross-sectional deformation (i.e., compression set) and self-adhesion (i.e., blocking during storage).

The disclosed core-sheath filaments including crosslinkable compositions are particularly well suited for application to rough surfaces and/or for adhesion to high surface energy surfaces. Desirably, the crosslinked compositions can be cleanly removed, if desired, from a variety of surfaces. Further, these crosslinkable compositions can be formulated to be clear and can be used in various applications where that characteristic is beneficial.

In many embodiments, upon dispensing the disclosed core-sheath filaments are pressure-sensitive adhesive compositions. According to the Pressure-Sensitive Tape Council, pressure-sensitive adhesives ("PSAs") are defined to possess the following properties: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature. Materials that are merely sticky or adhere to a surface do not constitute a PSA; the term PSA encompasses materials with additional viscoelastic properties. PSAs are adhesives that satisfy the Dahlquist criteria for tackiness, which means that the shear storage modulus is typically $3 \times 10^5$ Pa (300 kPa) or less when measured at 25° C. and 1 Hertz (6.28 radians/second). PSAs typically exhibit adhesion, cohesion, compliance, and elasticity at room temperature.

The term "adhesive composition" can refer herein to an adhesive that contains a curable (meth)acrylate copolymer and/or a cured (meth)acrylate copolymer. In many embodiments, the adhesive composition is a pressure-sensitive adhesive composition.

As used herein, terms as "a," "an," and "the" are not intended to refer to only a singular entity, but include the general class of which a specific example may be used for illustration. These terms can be used interchangeably with the term "at least one."

As used herein, the term "room temperature" refers to a temperature of about 20° C. to about 25° C. or about 22° C. to about 25° C.

The term "and/or" means one or all of the listed elements or a combination of any two or more of the listed elements.

The phrase "in a range of" or a similar phrase refers to all values within the stated range plus the endpoints of the range.

The term "(meth)acryloyl" refers to a group of formula $H_2C=CR_1-(CO)-$ where $R_1$ is hydrogen or methyl. That is, the (meth)acryloyl group is an acryloyl group (where $R_1$ is hydrogen) and/or a methacryloyl group (where $R_1$ is methyl). The (meth)acryloyl group is often a (meth)acryloyloxy group of formula $H_2C=CR_1-(CO)-O-$ or a (meth)acryloylamido group of formula $H_2C=CR_1-(CO)-NH-$.

The term "(meth)acrylate copolymer" refers to a polymeric material formed from two or more monomers (e.g., three or more monomers), wherein the majority (at least 50 weight percent, at least 60 weight percent, at least 70 weight percent, at least 80 weight percent, or at least 90 weight percent) of the monomers used to form the copolymer are (meth)acrylates (e.g., alkyl (meth)acrylates, aryl (meth)acrylates, aralkyl (meth)acrylates, alkaryl (meth)acrylates, and heteroalkyl (meth)acrylate). The term (meth)acrylates includes methacrylates, acrylates, or both. The term (meth) acrylate copolymer can apply herein to the precursor (meth) acrylate copolymer, and/or a curable (meth)acrylate copolymer, and/or a cured (meth)acrylate copolymer.

As used herein, the term "precursor (meth)acrylate copolymer" refers to a (meth)acrylate copolymer that does not contain the third monomeric units of Formula (III) but that can be reacted with an unsaturated reagent compound to form a curable (meth)acrylate copolymer. That is, the precursor (meth)acrylate copolymer can be converted to a curable (meth)acrylate copolymer having a pendant (meth) acryloyl group, which is the second type of third monomeric unit of Formula (III).

As used herein, the term "curable (meth)acrylate copolymer" refers to a (meth)acrylate copolymer that has third monomeric units of Formula (III) in addition to the first monomeric units of Formula (I) and the second monomeric units of Formula (II). The third monomeric units of Formula (III) can be of the first type (having an aromatic ketone group), of the second type (having a pendant (meth)acryloyl group), or both. The third monomeric units can undergo reaction when exposed to ultraviolet radiation (or to ultraviolet or visible light radiation in the presence of a photoinitiator). When the third monomeric units react to form a cured (meth)acrylate copolymer, covalent bonds are formed between different polymeric chains or within the same polymeric chain. This reaction typically increases the weight average molecular weight of the (meth)acrylate copolymer.

As used herein, the term "cured (meth)acrylate copolymer" refers to a (meth)acrylate copolymer resulting from the exposure of the curable (meth)acrylate copolymer to ultraviolet radiation (or to ultraviolet or visible light radiation in the presence a photoinitiator). In some embodiments, the material is considered cured when at least 50 weight percent (e.g., at least 60 weight percent, at least 70 weight percent, at least 80 weight percent, at least 90 weight percent, or at least 95 weight percent) of groups of Formula (III) have reacted to form a crosslinked site.

Core-Sheath Filaments

Figure 2:
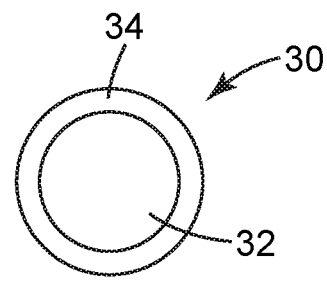
FIG. 2 is a schematic cross-sectional view of a core-sheath filament, according to an embodiment of the present disclosure.

An example core-sheath filament 20 is shown schematically in FIG. 1. The filament includes a core 22 and a sheath 24 surrounding (encasing) the outer surface 26 of the core 22. FIG. 2 shows the core-sheath filament 30 in a cross-sectional view. The core 32 is surrounded by the sheath 34. Any desired cross-sectional shape can be used for the core. For example, the cross-sectional shape can be a circle, oval, square, rectangular, triangular, or the like. The cross-sectional area of the core 32 is typically larger than the cross-sectional area of the sheath 34. In addition to shape and area, the cross-section of the filament also includes cross-sectional distances. Cross-sectional distances are equivalent to the lengths of chords that could join points on the perimeter of the cross-section. The term "longest cross-sectional distance" refers to the greatest length of a chord that can be drawn through the cross-section of a filament, at a given location along its axis.

The core-sheath filament usually has a relatively narrow longest cross-sectional distance (e.g., diameter for cores that have a circular cross-sectional shape) so that it can be used in applications where precise deposition of an adhesive is needed or advantageous. For instance, the core-sheath filament usually has an average longest cross-sectional distance in a range of 1 to 20 millimeters (mm). The average longest cross-sectional distance of the filament can be at least 1 mm, at least 2 mm, at least 3 mm, at least 4 mm, at least 5 mm, at least 6 mm, at least 8 mm, or at least 10 mm and can be up to 20 mm, up to 18 mm, up to 15 mm, up to 12 mm, up to 10 mm, up to 8 mm, up to 6 mm, or up to 5 mm. This average length can be, for example, in a range of 2 to 20 mm, 5 to 15 mm, or 8 to 12 mm.

Often, 1 to 10 percent of the longest cross-sectional distance (e.g., diameter) of the core-sheath filament is the sheath and 90 to 99 percent of the longest cross-sectional distance (e.g., diameter) of the core-sheath filament is the core. For example, up to 10 percent, up to 8 percent, up to 6 percent, or up to 4 percent and at least 1 percent, at least 2 percent, or at least 3 percent of the longest cross-sectional distance can be due to the sheath with the remainder being attributable to the core. The sheath extends completely around the core to prevent the core from sticking to itself. In some embodiments, however, the ends of the filament may contain only the core.

Often, the core-sheath filament has an aspect ratio of length to longest cross-sectional distance (e.g., diameter) of 50:1 or greater, 100:1 or greater, or 250:1 or greater. Core-sheath filaments having a length of at least about 20 feet (6 meters) can be useful for printing a hot-melt processable adhesive. Depending on the application or use of the core-sheath filament, having a relatively consistent longest cross-sectional distance (e.g., diameter) over its length can be desirable. For instance, an operator might calculate the amount of material being melted and dispensed based on the expected mass of filament per predetermined length; but if the mass per length varies widely, the amount of material dispensed may not match the calculated amount. In some embodiments, the core-sheath filament has a maximum variation of longest cross-sectional distance (e.g., diameter) of 20 percent over a length of 50 centimeters (cm), or even a maximum variation in longest cross-sectional distance (e.g., diameter) of 15 percent over a length of 50 cm.

Core-sheath filaments described herein can exhibit a variety of desirable properties, both as prepared and as a hot-melt processable adhesive composition. As formed, a core-sheath filament desirably has strength consistent with being handled without fracturing or tearing of the sheath. The structural integrity needed for the core-sheath filament varies according to the specific application of use. Preferably, a core-sheath filament has strength consistent with the requirements and parameters of one or more additive manufacturing devices (e.g., 3D printing systems). One additive manufacturing apparatus, however, could subject the core-sheath filament to a greater force when feeding the filament to a deposition nozzle than a different apparatus.

Advantageously, the elongation at break of the sheath material of the core-sheath filament is typically 50 percent or greater, 60 percent or greater, 80 percent or greater, 100 percent or greater, 250 percent or greater, 400 percent or greater, 750 percent or greater, 1000 percent or greater, 1400 percent or greater, or 1750 percent or greater and 2000 percent or less, 1500 percent or less, 900 percent or less, 500 percent or less, or 200 percent or less. Stated another way, the elongation at break of the sheath material of the core-sheath filament can range from 50 percent to 2000 percent, 50 to 1000, or 60 to 1000. In some embodiments, the elongation at break is at least 60 percent, at least 80 percent, or at least 100 percent. Elongation at break can be measured, for example, by the methods outlined in ASTM D638-14, using test specimen Type IV.

Advantages provided by at least certain embodiments of employing the core-sheath filament as a pressure-sensitive adhesive once it is melted and mixed include one or more of: low volatile organic compound ("VOC") characteristics, avoiding die cutting, design flexibility, achieving intricate non-planar bonding patterns, printing on thin and/or delicate substrates, and printing on an irregular and/or complex topography.

Any suitable method known to those of skill in the relevant arts can be used to prepare the core-sheath filaments. Most methods include forming a core composition that is a hot-melt processable adhesive. The hot-melt processable adhesive in the core may be prepared as described below. These methods further include forming a sheath composition comprising a non-tacky thermoplastic material. These methods still further include wrapping the sheath composition around the core composition.

In many embodiments, the method of making the core-sheath filament includes co-extruding the core composition and the sheath composition through a coaxial die such that the sheath composition surrounds the core composition. Optional additives for the core composition, which is a hot-melt processable adhesive, can be added in an extruder (e.g., a twin-screw extruder) equipped with a side stutter that allows for the inclusion of additives. Similarly, optional additives can be added to a sheath composition in the extruder. The hot-melt processable adhesive core can be extruded through the center portion of a coaxial die having an appropriate longest cross-sectional distance (i.e., diameter) while the non-tacky sheath can be extruded through the outer portion of the coaxial die. One suitable die is a filament spinning die as described in U.S. Pat. No. 7,773,834 (Ouderkirk et al.). Optionally, the filament can be cooled upon extrusion using a water bath. The filament can be lengthened using a belt puller. The speed of the belt puller can be adjusted to achieve a desired filament cross-sectional distance (e.g., diameter).

In other embodiments, the core can be formed by extrusion of the core composition. The resulting core can be rolled within a sheath composition having a size sufficient to surround the core. In still other embodiments, the core composition can be formed as a sheet. A stack of the sheets can be formed having a thickness suitable for the filament. A sheath composition can be positioned around the stack such that the sheath composition surrounds the stack.

Suitable components of the core-sheath filament are described in detail below.

Sheath

The sheath provides structural integrity to the core-sheath filament, as well as separating the adhesive core so that it does not adhere to itself (such as when the filament is provided in the form of a spool or roll) or so that is does not prematurely adhere to another surface. The sheath it typically selected to be thick enough to support the filament form factor and to allow for delivery of the core-sheath filament to a deposition location. On the other hand, the thickness of the sheath is selected so that its presence does not adversely affect the overall adhesive performance of the core-sheath filament.

The sheath material is typically selected to have a melt flow index ("MFI") that is less than or equal to 15 grams/10 minutes when measured in accord with ASTM D1238 at 190° C. and with a load of 2.16 kilograms. Such a low melt flow index is indicative of a sheath material that has sufficient strength (robustness) to allow the core-sheath filament to withstand the physical manipulation required for handling such as for use with an additive manufacturing apparatus. During such processes, the core-sheath filament often needs to be unwound from a spool, introduced into the additive manufacturing apparatus, and then advanced into a nozzle for melting and blending without breaking. Compared to sheath materials with a higher melt flow index, the sheath materials with a melt flow index that is less than or equal to 15 grams/10 minutes are less prone to breakage (tensile stress fracture) and can be wound into a spool or roll having a relatively small radius of curvature. In certain embodiments, the sheath material exhibits a melt flow index of 14 grams/10 minutes or less, 13 grams/10 minutes or less, 12 grams/10 minutes or less, 11 grams/10 minutes or less, 10 grams/10 minutes or less, 9 grams/10 minutes or less, 8 grams/10 minutes or less, 7 grams/10 minutes or less, 6 grams/10 minutes or less, 5 grams/10 minutes or less, 4 grams/10 minutes or less, 3 grams/10 minutes or less, 2 grams/10 minutes or less, or 1 grams/10 minutes or less. If desired, various sheath materials can be blended (e.g., melted and blended) together to provide a sheath composition having the desired melt flow index.

Low melt flow index values tend to correlate with high melt viscosities and high molecular weight. Higher molecular weight sheath materials tend to result in better mechanical performance. That is, the sheath materials tend to be more robust (i.e., the sheath materials are tougher and less likely to undergo tensile stress fracture). This increased robustness is often the result of increased levels of polymer chain entanglements. The higher molecular weight sheath materials are often advantageous for additional reasons. For example, these sheath materials tend to migrate less to adhesive/substrate interface in the final article; such migration can adversely affect the adhesive performance, especially under aging conditions. In some cases, however, block copolymers with relatively low molecular weights can behave like high molecular weight materials due to physical crosslinks. That is, the block copolymers can have low MFI values and good toughness despite their relatively low molecular weights.

As the melt flow index is lowered (such as to less than or equal to 15 grams/10 minutes), less sheath material is required to obtain the desired mechanical strength. That is, the thickness of the sheath layer can be decreased and its contribution to the overall longest cross-sectional distance (e.g., diameter) of the core-sheath filament can be reduced. This is advantageous because the sheath material may adversely impact the adhesive properties of the core pressure-sensitive adhesive if it is present in an amount greater than about 10 weight percent of the total weight of the filament.

For application to a substrate, the core-sheath filament is typically melted and mixed together before deposition on the substrate. The sheath material desirably is blended with the hot-melt processable adhesive in the core without adversely impacting the performance of the hot-melt processable adhesive. To blend the two compositions effectively, it is often desirable that the sheath composition is compatible with the core composition. The haze of the final compounded core and sheath is indicative of the compatibility of the two materials, where a final adhesive having little haze (e.g. less than 5 percent) is highly compatible, whereas a core and sheath composition with high haze (e.g. greater than 20 percent or especially greater than 50 percent) may be the result of phase separation between the core and sheath compositions.

If the core-sheath filament is formed by co-extrusion of the core composition and the sheath composition, the melt viscosity of the sheath composition is desirably selected to be fairly similar to that of the core composition. If the melt viscosities are not sufficiently similar (such as if the melt viscosity of the core composition is significantly lower than that of the sheath composition), the sheath may not surround the core in the filament. The filament can then have exposed core regions and the filament may adhere to itself. Additionally, if the melt viscosity of the sheath core composition is significantly higher than the core composition, during melt blending of the core composition and the sheath composition during dispensing, the non-tacky sheath may remain exposed (not blended sufficiently with the core) and adversely impact formation of an adhesive bond with the substrate. The melt viscosities of the sheath composition to the melt viscosity of the core composition is in a range of 100:1 to 1:100, in a range of 50:1 to 1:50, in a range of 20:1 to 1:20, in a range of 10:1 to 1:10, or in a range of 5:1 to 1:5. In many embodiments, the melt viscosity of the sheath composition is greater than that of the core composition. In such situations, the viscosity of the sheath composition to the core composition is typically in a range of 100:1 to 1:1, in a range of 50:1 to 1:1, in a range of 20:1 to 1:1, in a range of 10:1 to 1:1, or in a range of 5:1 to 1:1.

In addition to exhibiting strength, the sheath material is non-tacky. A material is non-tacky if it passes a "Self-Adhesion Test", in which the force required to peel the material apart from itself is at or less than a predetermining maximum threshold amount, without fracturing the material. Employing a non-tacky sheath allows the filament to be handled and optionally printed, without undesirably adhering to anything prior to deposition onto a substrate.

In certain embodiments, the sheath material exhibits a combination of at least two of low MFI as determined by ASTM D1238-13 (e.g., less than or equal to 15 grams/10 minutes), moderate elongation at break (e.g., 100% or more as determined by ASTM D638-14 using test specimen Type IV), low tensile stress at break (e.g., 10 MPa or more as determined by ASTM D638-14 using test specimen Type IV), and moderate Shore D hardness (e.g., 30-70 as determined by ASTM D2240-15). A sheath having at least two of these properties tends to have the toughness suitable for use in FFF-type applications.

In some embodiments, to achieve the goals of providing structural integrity and a non-tacky surface, the sheath comprises a material selected from styrenic copolymers (e.g., styrenic block copolymers such as styrene-butadiene block copolymers), polyolefins (e.g., polyethylene, polypropylene, and copolymers thereof), ethylene vinyl acetates, polyurethanes, ethylene methyl acrylate copolymers, ethylene (meth)acrylic acid copolymers, nylon, (meth)acrylic block copolymers, poly(lactic acid), anhydride modified ethylene acrylate resins, and the like. Depending on the method of making the core-sheath filament, it may be advantageous to at least somewhat match the polarity of the sheath polymeric material with that of the polymer in the core. The use of sheath materials that include polar groups such as, for example, oxy groups, carbonyl groups, amino groups, amido groups, ether groups, ester groups, thiol ether groups and combinations thereof may be advantageous.

Suitable styrenic materials for use in the sheath are commercially available and include, for example and without limitation, styrenic materials under the trade designation KRATON (e.g., KRATON D116 P, D1118, D1119, and A1535) from Kraton Performance Polymers (Houston, Tex., USA), under the trade designation SOLPRENE (e.g., SOLPRENE S-1205) from Dynasol (Houston, Tex., USA), under the trade designation QUINTAC from Zeon Chemicals (Louisville, Ky., USA), under the trade designations VECTOR and TAIPOL from TSRC Corporation (New Orleans, La., USA), and under the trade designations K-RESIN (e.g., K-RESIN DK11) from Ineos Styrolution (Aurora, Ill., USA).

Suitable polyolefins are not particularly limited. Suitable polyolefin resins include for example and without limitation, polypropylene (e.g., a polypropylene homopolymer, a polypropylene copolymer, and/or blends comprising polypropylene), polyethylene (e.g., a polyethylene homopolymer, a polyethylene copolymer, high density polyethylene ("HDPE"), medium density polyethylene ("MDPE"), low density polyethylene ("LDPE"), and combinations thereof. For instance, suitable commercially available LDPE resins include PETROTHENE NA217000 available from LyondellBasell (Rotterdam, Netherlands) with a MFI of 5.6 grams/10 minutes, MARLEX 1122 available from Chevron Phillips (The Woodlands, Tex.) Suitable HDPE resins include ELITE 5960G from Dow Chemical Company (Midland, Mich., USA) and HDPE HD 6706 series from ExxonMobil (Houston, Tex., USA). Polyolefin block copolymers are available from Dow Chemical under the trade designation INFUSE (e.g., INFUSE 9807).

Suitable commercially available thermoplastic polyurethanes may include, for instance and without limitation, ESTANE 58213 and ESTANE ALR 87A available from the Lubrizol Corporation (Wickliffe, Ohio).

Suitable ethylene vinyl acetate ("EVA") polymers (i.e., copolymers of ethylene with vinyl acetate) for use in the sheath include resins from Dow, Inc. (Midland, Mich.) available under the trade designation ELVAX. Typical grades range in vinyl acetate content from 9 to 40 weight percent and a melt flow index of as low as 0.3 grams/10 minutes. (Per ASTM D1238.) One exemplary material is ELVAX 3135 SB with a MFI of 0.4 grams/10 minutes. Suitable EVAs also include high vinyl acetate ethylene copolymers from LyondellBasell (Houston, Tex.) available under the trade designation ULTRATHENE. Typical grades range in vinyl acetate content from 12 to 18 weight percent. Suitable EVAs also include EVA copolymers from Celanese Corporation (Dallas, Tex.) available under the trade designation ATEVA. Typical grades range in vinyl acetate content from 2 to 26 weight percent.

Suitable nylon materials for use in the sheath include a nylon terpolymeric material from Nylon Corporation of America under the trade designation NYCOA CAY.

Suitable ethylene acrylate copolymers, e.g., poly(ethylene-co-methyl acrylate), for use in the sheath include resins from Dow Inc. (Midland, Mich., USA) under the trade designation ELVALOY (e.g., ELVALOY 1330 with 30 percent methyl acrylate and a MFI of 3.0 grams/10 minutes, ELVALOY 1224 with 24 percent methyl acrylate and a MFI of 2.0 grams/10 minutes, and ELVALOY 1609 with 9 percent methyl acrylate and a MFI of 6.0 grams/10 minutes).

Suitable anhydride modified ethylene acrylate resins are available from Dow under the trade designation BYNEL such as BYNEL 21E533 with a MFI of 7.3 grams/10 minutes and BYNEL 30E753 with a MFI of 2.1 grams/10 minutes.

Suitable ethylene (meth)acrylic copolymers for use in the sheath include resins from Dow, Inc. under the trade designation NUCREL (e.g., NUCREL 925 with an MFI of 25.0 grams/10 minutes and NUCREL 3990 with a MFI of 10.0 grams/10 minutes).

Suitable (meth)acrylic block copolymers for use in the sheath include block copolymers from Kuraray (Chiyoda-ku, Tokyo, JP) under the trade designation KURARITY (e.g., KURARITY LA2250 and KURAITY LA4285). KURARITY LA2250, which has a MFI of 22.7 grams/10 minutes, is an ABA block copolymer with poly(methyl methacrylate) as the A blocks and poly(n-butyl acrylate) as the B block. About 30 weight percent of this polymer is poly(methyl methacrylate). KURAITY LA4285, which has a MFI of 1.8 grams/10 minutes, is an ABA block copolymer with poly(methyl methacrylate) as the A blocks and poly(n-butyl acrylate as the B block. About 50 weight percent of this polymer is poly(methyl methacrylate). Varying the amount of poly(methyl methacrylate) in the block copolymer alters its glass transition temperature and its toughness.

Suitable poly(lactic acid) for use in the sheath include those available from Natureworks, LLC (Minnetonka, N. Mex., USA) under the trade designation INGEO (e.g., INGEO 6202D Fiber grade).

The sheath typically makes up 1 to 10 weight percent of the total weight of the core-sheath filament. The amount can be at least 1 weight percent, at least 2 weight percent, at least 3 weight percent, at last 4 weight percent, at least 5 weight percent and up to 10 weight percent, up to 9 weight percent, up to 8 weight percent, up to 7 weight percent, up to 6 weight percent, or up to 5 weight percent.

Core

The core comprises a curable (meth)acrylate copolymer. The curable (meth)acrylate copolymer includes at least three different types of monomeric units: first monomeric units of Formula (I), second monomeric units of Formula (II), and third monomeric units of Formula (III). Still other optional monomeric units can be included in the curable (meth)acrylate copolymer. Depending on the selection of the third monomeric unit, which includes the group responsible for curing the (meth)acrylate copolymer, the curable (meth)acrylate copolymer can be formed directly from a polymerizable composition containing the corresponding first monomer, second monomer, third monomer, and other optional monomers. In some embodiments, particularly for curable (meth)acrylate copolymers having a pendant (meth) acryloyl group, a precursor (meth)acrylate copolymer is initially prepared and then further reacted with an unsaturated reagent compound to form the third monomeric unit (having a pendant (meth)acryloyl group) and the resulting curable (meth)acrylate copolymer.

Stated differently, some curable (meth)acrylate copolymers are formed from precursor (meth)acrylate copolymers while other curable (meth)acrylate copolymers are formed directly from its constituent monomers. The precursor (meth)acrylate copolymer does not have a third monomeric unit of Formula (III) but has a group in a fourth monomeric unit of Formula (IV) that can be further reacted to form the second type of third monomeric unit of Formula (III) having a (meth)acryloyl group. The precursor (meth)acrylate includes the first monomeric units of Formula (I) and the second monomeric units of Formula (II). The curable (meth) acrylate copolymer formed from the precursor (meth)acrylate copolymer has a third monomeric unit of Formula (III) with a pendant (meth)acryloyl group. The cured (meth) acrylate copolymer is formed by exposing the curable (meth)acrylate copolymer to ultraviolet radiation or by exposing the curable (meth)acrylate copolymer to ultraviolet or visible light radiation in the presence of a photoinitiator.

The curable (meth)acrylate copolymer includes a first monomeric unit of Formula (I) in an amount in a range of 50 to 99 weight percent based on a total weight of monomeric units in the curable (meth)acrylate copolymer.

In Formula (I), $R_1$ is hydrogen or methyl and $R_2$ is an alkyl, heteroalkyl, aryl, aralkyl, or alkaryl group. Stated differently, the first monomeric unit is derived from an alkyl (meth)acrylate, heteroalkyl (meth)acrylate, aryl (meth)acrylate, aralkyl (meth)acrylate, alkaryl (meth)acrylate, or a mixture thereof (i.e., the (meth)acrylate copolymer can be have multiple first monomeric units with different $R_2$ groups). Suitable alkyl $R_2$ groups often have 1 to 32 carbon atoms, 1 to 24 carbon atoms, 1 to 18 carbon atoms, 1 to 16 carbon atoms, 1 to 12 carbon atoms, 1 to 10 carbon atoms, 1 to 8 carbon atoms, 1 to 6 carbon atoms, or 1 to 4 carbon atoms. The alkyl groups can be linear, branched, cyclic, or a combination thereof. Suitable heteroalkyl $R_2$ groups often have 1 to 30 carbon atoms or more and 1 to 20 carbon atoms or more, 1 to 20 carbon atoms and 1 to 10 heteroatoms, 1 to 16 carbon atoms and 1 to 8 heteroatoms, 1 to 12 carbon atoms and 1 to 6 heteroatoms, or 1 to 10 carbon atoms and 1 to 5 heteroatoms. The heteroatoms are often oxygen (oxy groups) but can be sulfur (—S— groups) or nitrogen (—NH— groups). Suitable aryl $R_2$ groups typically are carbocyclic aromatic groups. The aryl group often has 6 to 12 carbon atoms or 6 to 10 carbon atoms. In many embodiments, the aryl is phenyl. Suitable aralkyl groups are of formula —R—Ar where R is an alkylene and Ar is an aryl. The alkylene groups, which are a divalent radical of an alkane, typically have 1 to 10 carbon atoms, 1 to 6 carbon atoms, or 1 to 4 carbon atoms and the aryl group typically has 6 to 12 carbon atoms, 6 to 10 carbon atoms, or 6 carbon atoms. In many embodiments, the aryl is phenyl. Suitable alkaryl groups are of formula —Ar—R wherein Ar is an arylene (i.e., a divalent radical of a carbocyclic aromatic compound) and R is an alkyl. The arylene typically has 6 to 12 carbon atoms, 6 to 10 carbon atoms, or 6 carbon atoms. In many embodiments, the arylene is phenylene. The alkyl group of the alkaryl group is the same as described above for alkyl groups but often has 1 to 10 carbon atoms, 1 to 6 carbon atoms, or 1 to 4 carbon atoms.

The $R_2$ group in Formula (I) often is an alkyl. Stated differently, the first monomeric unit is often derived from (i.e., formed from) an alkyl (meth)acrylate. Exemplary alkyl (meth)acrylates often include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, isoamyl (meth)acrylate, 2-methylbutyl (meth)acrylate, n-hexyl (meth)acrylate, cyclohexyl (meth)acrylate, 4-methyl-2-pentyl (meth)acrylate, 2-ethylhexyl (meth)acrylate, 2-methylhexyl (meth)acrylate, n-octyl (meth)acrylate, isooctyl (meth)acrylate, 2-octyl (meth)acrylate, n-nonyl (meth)acrylate, isononyl (meth)acrylate, isobornyl (meth)acrylate), adamantyl (meth)acrylate, n-decyl (meth)acrylate, isodecyl (meth)acrylate, 2-propylheptyl (meth)acrylate, isotridecyl (meth)acrylate, isostearyl (meth)acrylate, octadecyl (meth) acrylate, 2-octyldecyl (meth)acrylate, dodecyl (meth)acrylate, lauryl (meth)acrylate, and heptadecanyl (meth)acrylate. Some other exemplary branched alkyl (meth)acrylates are (meth)acrylic acid esters of Guerbet alcohols having 12 to 32 carbon atoms as described in PCT Patent Application Publication WO 2011/119363 (Clapper et al.). In some embodiments, the alkyl (meth)acrylate is chosen that has an alkyl group with no greater than 8 carbon atoms. These alkyl (meth)acrylate often have a higher solubility parameter compared to those having an alkyl group with greater than 8 carbon atoms. This can increase the compatibility of this monomer with the (meth)acrylic acid or (meth)acrylamide used to form the second monomeric units.

Group $R_2$ can be a heteroalkyl, aryl, aralkyl, or alkaryl group. Examples of monomers with a heteroalkyl group include, but are not limited to, ethoxyethoxyethyl (meth) acrylate, polyethylene glycol (meth)acrylate, and polypropylene glycol (meth)acrylate. Examples of such monomers include, but are not limited to, 2-phenylethyl acrylate, 3-phenylethyl acrylate, and 2-biphenylethyl acrylate.

The first monomeric unit is often selected to control the final glass transition temperature ("Tg") and shear storage modulus ("G'") of the (meth)acrylate copolymer and the adhesive. In many embodiments, the alkyl (meth)acrylates are alkyl acrylates. The use of alkyl acrylates rather than alkyl methacrylates often results in (meth)acrylate copolymers having a lower glass transition temperature and lower shear storage modulus (G'). The lower glass transition temperature and lower shear storage modulus (G') of the (meth)acrylate copolymers may be needed to provide a pressure-sensitive adhesive composition. The final glass transition temperature (Tg) for the (meth)acrylate copolymer is typically equal to at least −50° C., at least −40° C., at least −30° C. at least −20° C., at least −15° C., at least −10° C., at least −5° C., or at least 0° C. and is often no greater than 40° C., no greater than 30° C., no greater than 20° C., or no greater than 10° C. When the Tg exceeds 20° C., the adhesive may need to be heat-activated (i.e. upon heating slightly above the Tg, the material becomes tacky and adheres with no more than finger pressure). Upon cooling to below the Tg these heat-activated adhesives will no longer be tacky but have sufficient ability to hold onto an adherend and have sufficient cohesive strength to be cleanly removed from the adherend.

The curable (meth)acrylate copolymer contains at least 50 weight percent of the first monomeric unit based on a total weight of the curable (meth)acrylate copolymer. If the amount of the first monomeric unit is lower than at least 50 weight percent, the glass transition temperature of the (meth) acrylate copolymer may not be suitable for a pressure-sensitive adhesive. For example, the (meth)acrylate copolymer often contains at least 55 weight percent, at least 60 weight percent, at least 65 weight percent, at least 70 weight percent, or at least 75 weight percent of the first monomeric unit. The amount of the first monomeric unit can be up to 99 weight percent. If the amount of the first monomeric unit is greater than 99 weight percent, there may be insufficient amounts of the second monomeric unit and the third monomeric unit in the curable (meth)acrylate copolymer. For example, the amount can be up to 95 weight percent, up to 90 weight percent, up to 85 weight percent, or up to 80 weight percent. In some embodiments, the amount of the first monomeric unit is in a range of 50 to 99 weight percent, 60 to 99 weight percent, 70 to 99 weight percent, 80 to 99 weight percent, 60 to 95 weight percent, 70 to 95 weight percent, or 80 to 90 weight percent. The amounts are based on the total weight of the (meth)acrylate copolymer.

The curable (meth)acrylate copolymer further includes a second monomeric unit of Formula (II) in an amount in a range of 1 to 13 weight percent based on the total weight of monomeric units in the curable (meth)acrylate copolymer.

(II)

Group $R_1$ is hydrogen or methyl. Group $R_4$ is —OH, —NH$_2$, a secondary amino group, a tertiary amino group, an (N,N-dialkylaminoalkyl)-O— group, or an (N,N-dialkylaminoalkyl)-N— group. Stated differently, when $R_4$ is —NH$_2$, the second monomeric unit is derived from (meth)acrylamide, which refers to acrylamide and/or methacrylamide, or when $R_4$ is —OH, the second monomeric unit is derived from (meth)acrylic acid, which refers to acrylic acid and/or methacrylic acid.

The second monomeric unit advantageously provides hydrogen bonding within the curable (meth)acrylate copolymer. This hydrogen bonding tends to enhance the dimensional stability of the adhesive filament prior to dispensing. Stated differently, dimensional stability can be provided even though no covalent crosslinks have been formed in the curable (meth)acrylate copolymer (i.e. covalent crosslinks form from the third monomeric unit of the curable (meth) acrylate when exposed to ultraviolet radiation or when exposed to ultraviolet or visible light radiation in the presence of a photoinitiator). The second monomeric unit also can enhance adhesion of the cured adhesive composition to substrates and/or enhance the cohesive strength of both the curable and cured adhesive compositions.

Exemplary second monomeric units with an acidic group can be, for example, a carboxylic acid monomer. Exemplary acidic monomers include, but are not limited to, (meth) acrylic acid, itaconic acid, fumaric acid, crotonic acid, citraconic acid, maleic acid, oleic acid, β-carboxyethyl acrylate, and the like. In many embodiments, the monomer is (meth)acrylic acid.

An exemplary second monomeric unit with a primary amido group is (meth)acrylamide. Exemplary second monomeric units with secondary amido groups include, but are not limited to, (meth)acryloyl morpholine and N-alkyl (meth)acrylamides such as N-methyl (meth)acrylamide, N-ethyl (meth)acrylamide, N-isopropyl (meth)acrylamide, N-tert-octyl (meth)acrylamide, or N-octyl (meth)acrylamide. Exemplary second monomeric units with a tertiary amido group include, but are not limited to, N,N-dialkyl (meth)acrylamides such as N,N-dimethyl (meth)acrylamide, N,N-diethyl (meth)acrylamide, N,N-dipropyl (meth)acrylamide, and N,N-dibutyl (meth)acrylamide.

Exemplary second monomeric units with an amino group include various N,N-dialkylaminoalkyl (meth)acrylates (i.e., monomeric units including an (N,N-dialkylaminoalkyl)-O— group) and N,N— dialkylaminoalkyl (meth)acrylamides (i.e., monomeric units including an (N,N-dialkylaminoalkyl)-N— group). Examples include, but are not limited to, N,N-dimethyl aminoethyl (meth)acrylate, N,N—dimethylaminoethyl (meth)acrylamide, N,N-dimethylaminopropyl (meth)acrylate, N,N— dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide.

The (meth)acrylate copolymer typically contains at least 1 weight percent of the second monomeric unit. This amount is often needed to provide the desired hydrogen bonding within the curable (meth)acrylate copolymer. In some examples, the (meth)acrylate copolymer contains at least 1.5 weight percent, at least 2 weight percent, at least 3 weight percent, at least 4 weight percent, at least 5 weight percent, at least 6 weight percent, at least 7 weight percent, at least 8 weight percent, at least 9 weight percent, or at least 10 weight percent of the second monomeric unit. The amount of the second monomeric unit can be up to 13 weight percent. If greater than 13 weight percent of the second monomeric unit is included in the (meth)acrylate copolymer, the glass transition temperature may be too high to function as a pressure-sensitive adhesive. Additionally, there may be miscibility issues with the other monomers included in the polymerizable composition used to form the (meth)acrylate copolymer. In some examples, the (meth)acrylate copolymer contains up to 10 weight percent, up to 9 weight percent, up to 8 weight percent, up to 7 weight percent, or up to 6.5 weight percent of the second monomeric unit. The amount of the second monomeric unit is often in a range of 1 to 13 weight percent, 3 to 10 weight percent, or 5 to 10 weight percent based on a total weight of the (meth)acrylate copolymer.

The curable (meth)acrylate copolymer still further comprises a third monomeric unit of Formula (III) in an amount in a range of 0.05 to 5 weight percent based on the total weight of monomeric units of the curable (meth)acrylate copolymer.

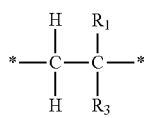

(III)

In Formula (III), group $R_1$ is the same as defined above and group $R_3$ comprises 1) an aromatic ketone group that causes hydrogen abstraction from a polymeric chain when exposed to ultraviolet radiation or 2) a (meth)acryloyl group (i.e., pendant (meth)acryloyl group) that undergoes free radical polymerization when exposed to ultraviolet or visible light radiation in the presence of a photoinitator. The hydrogen abstraction type aromatic ketone groups typically require exposure to ultraviolet radiation to trigger a reaction. The pendant (meth)acrylate group can react upon exposure to either ultraviolet or visible light radiation based on the absorbance of the photoinitiator in the ultraviolet and visible regions of the electromagnetic spectra.

In the first type of the third monomeric unit of Formula (III), the $R_3$ group comprises an aromatic ketone group. When exposed to ultraviolet radiation, the aromatic ketone group can abstract a hydrogen atom from another polymeric chain or from another portion of the polymeric chain. This abstraction results in the formation of radicals that can subsequently combine to form crosslinks between polymeric chains or within the same polymeric chain. In many embodiments, the aromatic ketone group is an aromatic ketone group such as, for example, a derivative of benzophenone, acetophenone, or anthroquinone. Monomers that can result in this type of third monomeric unit of Formula (III) include, for example, 4-(meth)acryloyloxybenzophenone, 4-(meth) acryloyloxyethoxybenzophenone, 4-(meth)acryloyloxy-4'-methoxybenzophenone, 4-(meth)acryloyloxyethoxy-4'-methoxybenzophenone, 4-(meth)acryloyloxy-4'-bromobenzophenone, 4-acryloyloxyethoxy-4'-bromobenzophenone, and the like, as well as monomers described in U.S. Pat. No. 10,189,771 (Benson et al.).

In the second type of the third monomeric unit of Formula (III), the $R_3$ group comprises a (meth)acryloyl group. That is, $R_3$ is a group that can undergo free-radical reaction in the presence of ultraviolet or visible light radiation and a photoinitiator. The curable (meth)acrylate copolymer is typically not prepared directly with this type of third monomeric unit present. Rather, a precursor (meth)acrylate copolymer is initially prepared and then further reacted with an unsaturated reagent compound to introduce the pendant (meth) acryloyl group. Typically, the introduction of the pendant (meth)acryloyl group involves (1) the reaction between a nucleophilic group on the precursor (meth)acrylate copolymer and an electrophilic group on the unsaturated reagent compound (i.e., the unsaturated reagent compound includes both an electrophilic group and a (meth)acryloyl group) or (2) the reaction between electrophilic groups on the precursor (meth)acrylate copolymer and a nucleophilic group on the unsaturated reagent compound (i.e., the unsaturated reagent compound includes both a nucleophilic group and a (meth)acryloyl group). These reactions between the nucleophilic group and electrophilic group typically are ring opening, addition, or condensation reactions.

In some embodiments of this second type, the precursor (meth)acrylate copolymer has hydroxy, carboxylic acid (—COOH), or anhydride (—O—(CO)—O—) groups. If the precursor (meth)acrylate copolymer has hydroxy groups, the unsaturated reagent compound often has a carboxylic acid (—COOH), isocyanato (—NCO), epoxy (i.e., oxiranyl), or anhydride group in addition to a (meth)acryloyl group. If the precursor (meth)acrylate copolymer has carboxylic acid groups, the unsaturated reagent compound often has a hydroxy, amino, epoxy, isocyanato, aziridinyl, azetidinyl, or oxazolinyl group in addition to a (meth)acryloyl group. If the precursor (meth)acrylate copolymer has anhydride groups, the unsaturated reagent compound often has a hydroxy or amine group in addition to a (meth)acryloyl group.

In some examples, the precursor (meth)acrylate copolymer has carboxylic acid groups and the unsaturated reagent compound has an epoxy group. Example unsaturated reagent compounds include, for example, glycidyl (meth)acrylate and 4-hydroxybutyl acrylate glycidyl ether. In other examples, the precursor (meth)acrylate copolymer has anhydride groups and it is reacted with an unsaturated reagent compound that is a hydroxy-substituted alkyl (meth)acrylate such as 2-hydroxyethyl (meth)acrylate, 3-hydroxypropyl (meth)acrylate, or the like. In yet other examples of this second type, the precursor (meth)acrylate copolymer has hydroxy groups and the unsaturated reagent compound has an isocyanato group and a (meth)acryloyl group. Such unsaturated reagent compounds include, but are not limited to, isocyanatoalkyl (meth)acrylate such as isocyanatoethyl (meth)acrylate. The use of a precursor (meth)acrylate copolymer having hydroxy groups may be preferable in applications where the adhesive is used in articles having metal-containing components. Hydroxy groups are less problematic in terms of corrosion than acidic groups or anhydride groups.

The second type of $R_3$ group can be of formula $CH_2$=$CHR_1$—(CO)-Q-L- where L is a linking group and Q is oxy (—O—) or —NH—. The group L includes an alkylene, arylene, or combination thereof and can optionally further include —O—, —O—(CO)—, —NH—(CO)—, —NH—, or a combination thereof depending on the particular precursor (meth)acrylate copolymer and the particular unsaturated reagent compound that is reacted to form the (meth)acryloyl-containing $R_3$ group. In some particular examples, the second type of $R_3$ group is $H_2C$=$CHR_1$—(CO)—O—$R_6$—NH—(CO)—O—$R_5$—O—(CO)— formed by the reaction of a pendant hydroxy-containing group of formula —(CO)—O—$R_5$—OH on the precursor (meth)acrylate with a unsaturated reagent compound that is an isocyanatoalkyl (meth)acrylate of formula $H_2C$=$CHR_1$—(CO)—O—$R_6$—NCO. Groups $R_5$ and $R_6$ are each independently an alkylene group such as an alkylene having 1 to 10 carbon atoms, 1 to 6 carbon atoms, or 1 to 4 carbon atoms. $R_1$ is methyl or hydrogen.

The third monomeric unit is typically present in an amount in a range of 0.05 to 5 weight percent based on a total weight of the (meth)acrylate copolymer. If less than 0.05 weight percent is used, the concentration may be too low to ensure that adequate curing occurs. For example, the concentration can be at least 0.1 weight percent, at least 0.2 weight percent, at least 0.3 weight percent, or at least 0.4 weight percent. An amount over 5 weight percent, however, may result in decreased adhesive performance for an adhesive containing the cured (meth)acrylate copolymer, and/or increased stress buildup in the articles containing the cured (meth)acrylate copolymer, and/or delamination of the adhesive from the substrates within the articles containing the cured (meth)acrylate copolymer. Also, if the third monomeric units are of the first type containing an aromatic ketone group, yellowing can occur in the adhesive layer when the amount exceeds 5 weight percent or even lower. For example, the concentration can be up to 4 weight percent, up to 3 weight percent, up to 2 weight percent, up to 1.5 weight percent, up to 1 weight percent, up to 0.8 weight percent, or up to 0.6 weight percent. In some embodiments, the amount of the third monomeric unit is in a range of 0.1 to 5 weight percent, 0.1 to 4 weight percent, 0.1 to 3 weight percent, 0.1 to 2 weight percent, 0.2 to 2 weight percent, 0.2 to 1.5 weight percent, 0.2 to 1 weight percent, 0.3 to 5 weight percent, 0.3 to 2 weight percent, 0.3 to 1 weight percent, 0.4 to 2 weight percent, or 0.4 to 1 weight percent.

Other optional monomeric units ($4^{th}$ monomeric units) can be present in the (meth)acrylate copolymer. Other optional monomeric units are typically selected based on compatibility with the other monomeric units in the (meth)acrylate copolymer. These optional monomeric units may also be used to tune the rheological properties of the (meth)acrylate copolymer, such as for adjusting the glass transition temperature or shear storage modulus (G'). These optional monomeric units are also typically selected based on the final use of the curable and/or cured (meth)acrylate copolymer. Optional monomers may enhance the compatibility of the sheath with the core.

Suitable nitrogen-containing monomeric units may include, for example, monomeric units derived from various N-alkyl (meth)acrylamides and N,N-dialkyl (meth)acrylamides can be included such as N-methyl (meth)acrylamide, N-ethyl (meth)acrylamide, N,N-dimethyl (meth)acrylamide, and N,N-diethyl (meth)acrylamide, N-isopropyl (meth)acrylamide, and N-octyl (meth)acrylamide. Other monomeric units derived from various N,N-dialkylaminoalkyl (meth)acrylates and N,N-dialkylaminoalkyl (meth)acrylamides can be included such as, for example, N,N-dimethyl aminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N— diethylaminoethyl (meth)acrylamide, N,N-diethylaminopropyl (meth)acrylate, and N,N—diethylaminopropyl (meth)acrylamide. Other examples include monomeric units derived from N-vinyl pyrrolidone, N-morpholino (meth)acrylate, diacetone (meth)acrylamide, and N-vinyl caprolactam.

Other optional monomeric units included are those formed from (meth)acrylates having an aromatic group that are not of Formula (I) or Formula (III). These monomeric units may negatively impact optical clarity and the amount may need to be controlled for some applications. Example monomers include, but are not limited to, 2-phenoxyethyl acrylate (available under the trade designation SR339 from Sartomer (Exton, Pa.)), 2-(phenylthio)ethyl acrylate (available from Cytec Ind. (Woodland, N.J.)), 2-phenylphenoxyethyl acrylate (available from Double Bond Chemical Ind. Co. (Taipei, Taiwan)), propionic acid (3-phenoxyphenyl) methyl ester (available from Miwon Chemicals Co. (Korea)).

The amount of any other optional monomer or combination of optional monomers is typically no greater than 20 weight percent based on a total weight of the curable (meth)acrylate copolymer. That is, the amount of the other optional monomer is no greater than 15 weight percent, no greater than 10 weight percent, or no greater than 5 weight percent and, if present, equal to at least 1 weight percent, at least 2 weight percent, or at least 5 weight percent. The amount can be in a range of 0 to 20 weight percent, 1 to 20 weight percent, 5 to 20 weight percent, 0 to 10 weight percent, 1 to 10 weight percent, 0 to 5 weight percent, or 1 to 5 weight percent.

In addition to the monomers used to form the various monomeric units described above, the polymerizable composition used to prepare the (meth)acrylate copolymer typically includes a free radical initiator to commence polymerization of the monomers. The free radical initiator can be a photoinitiator or a thermal initiator. The amount of the free radical initiator is often in a range of 0.05 to 5 weight percent based on a total weight of monomers used.

Suitable thermal initiators include various azo compound such as those commercially available under the trade designation VAZO from E. I. DuPont de Nemours Co. (Wilmington, Del., USA) including VAZO 67, which is 2,2'-azobis (2-methylbutane nitrile), VAZO 64, which is 2,2'-azobis (isobutyronitrile), VAZO 52, which is (2,2'-azobis(2,4-dimethylpentanenitrile)) and VAZO 88, which is 1,1'-azobis (cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemicals, Inc. (Philadelphia, Pa.) under the trade designation LUPEROX (e.g., LUPEROX 101, which is 2,5-bis(tert-butylperoxy)-2,5-dimethylhexane, and LUPEROX 130, which is 2,5-dimethyl-2,5-di-(tert-butylperoxy)-3-hexyne); various hydroperoxides such as tert-amyl hydroperoxide and tert-butyl hydroperoxide; and mixtures thereof.

In many embodiments, a photoinitiator is used, particularly when the second type of monomeric unit of Formula (III) is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxycyclohexyl phenyl ketone (commercially available under the trade designation IRGACURE 184), bis(2,4,6-trimethylbenzoyl)phenylphosphineoxide (commercially available under the trade designation IRGACURE 819), 2,4,6-trimethylbenzoylphenylphosphinic acid ethyl ester (commercially available under the trade designation IRGACURE TPO-L), 1-[4-(2-hydroxyethoxy) phenyl]-2-hydroxy-2-methyl-1-propane-1-one (commercially available under the trade designation IRGACURE 2959), 2-benzyl-2-dimethylamino-1-(4-morpholinophenyl) butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y., USA).

The polymerizable composition may optionally further contain a chain transfer agent to control the molecular weight of the resultant (meth)acrylate copolymer. Examples of useful chain transfer agents include, but are not limited to, carbon tetrabromide, alcohols (e.g., ethanol and isopropanol), mercaptans or thiols (e.g., lauryl mercaptan, butyl mercaptan, tert-dodecyl mercaptan, ethanethiol, isooctylthioglycolate, 2-ethylhexyl thioglycolate, 2-ethylhexyl mercaptopropionate, ethyleneglycol bisthioglycolate), and mixtures thereof. If used, the polymerizable mixture may include up to 1 weight percent of a chain transfer agent based on a total weight of monomers. The amount can be up to 0.5 weight percent, up to 0.3 weight percent, up to 0.2 weight percent, or up to 0.1 weight percent and is often equal to at least 0.005 weight percent, at least 0.01 weight percent, at least 0.05 weight percent, or at least 0.1 weight percent.

For example, the polymerizable composition can contain 0.005 to 0.5 weight percent, 0.01 to 0.5 weight percent, 0.05 to 0.2 weight percent, 0.01 to 0.2 weight percent, or 0.01 to 0.1 weight percent chain transfer agent based on the total weight of monomers.

The polymerizable composition can further include other components such as, for example, antioxidants and/or stabilizers such as hydroquinone monomethyl ether (p-methoxyphenol, MeHQ), and those available under the trade designation IRGANOX 1010 (tetrakis(methylene(3,5-di-tert-butyl-4-hydroxyhydrocinnamate))methane) from BASF Corp. (Florham Park, N.J., USA). The antioxidant and/or stabilizer can be used to increase the temperature stability of the resulting (meth)acrylate copolymer. If used, an antioxidant and/or stabilizer is typically used in the range of 0.01 percent by weight (weight percent) to 1.0 weight percent, based on the total weight of monomers in the polymerizable composition.

The polymerization of the polymerizable composition can occur in the presence or absence of an organic solvent. If an organic solvent is included in the polymerizable composition, the amount is often selected to provide the desired viscosity to the polymerizable composition and to the polymerized composition. Examples of suitable organic solvents include, but are not limited to, methanol, tetrahydrofuran, ethanol, isopropanol, heptane, acetone, methyl ethyl ketone, methyl acetate, ethyl acetate, toluene, xylene, and ethylene glycol alkyl ether. Those solvents can be used alone or combined as mixtures. In some embodiments, the organic solvent is present in an amount less than 15 weight percent, less than 10 weight percent, less than 8 weight percent, less than 6 weight percent, less than 5 weight percent, or less than 2 weight percent based on the total weight of the polymerizable composition. If used, any organic solvent typically is removed at the completion of the polymerization reaction or during coating. In many embodiments, the polymerization occurs with little or no organic solvent present. That is the polymerizable composition is free of organic solvent or contains a minimum amount of organic solvent.

Either the curable (meth)acrylate copolymer or the precursor (meth)acrylate copolymer, depending on the type of monomeric unit of Formula (III) that is used, can be prepared by any conventional polymerization method (such as solution polymerization or emulsion polymerization) including thermal bulk polymerization under adiabatic conditions, as is disclosed in U.S. Pat. No. 5,637,646 (Ellis) and U.S. Pat. No. 5,986,011 (Ellis et al.). Other methods of preparing either type of (meth)acrylate copolymer include the continuous free radical polymerization methods described in U.S. Pat. Nos. 4,619,979 and 4,843,134 (Kotnour et al.) and the polymerization within a polymeric package as described in U.S. Pat. No. 5,804,610 (Hamer et al.).

The curable (meth)acrylate copolymer has a weight average molecular weight ("Mw") that is in a range of 100,000 to 1,500,000 Daltons ("Da"). If the molecular weight is lower than 100,000 Da the adhesive may not have suitable creep resistance to maintain uniform cross-sectional area as it may be prone to sag or slump within the sheath. Furthermore, curable (meth)acrylate copolymers with Mw that is too low have demonstrated cold flow which may be undesirable in some embodiments. Curable (meth)acrylate copolymer with too high of a Mw may have too high of a melt viscosity for blending with the sheath in the dispensing unit and a stress-relaxation time that is too long to effectively flow and cover various features on a rough substrate. If the molecular weight is lower than 100,000 Da, the amount of the third monomeric unit needed to effectively cure the (meth)acrylate copolymer may be quite high. If the amount of the third monomeric unit is too high, the curing reaction may proceed too rapidly. That is, the (meth)acrylate copolymer may change from having no gel content to having a very high gel content (and thus a highly elastic cured adhesive composition, which may not be desirable in some applications). The weight average molecular weight is often at least 125,000 Da, at least 150,000 Da, at least 175,000 Da, at least 200,000 Da, at least 225,000 Da, at least 250,000 Da, or at least 300,000 Da. The molecular weight can be up to 1,500,000 Da, up to 1,250,000 Da, up to 1,000,000 Da, up to 900,000 Da, or up to 800,000 Da. In some embodiments, the weight average molecular weight is in a range of 125,000 to 1,500,000 Da, in a range of 100,000 to 1,250,000 Da, in a range of 150,000 to 1,500,000 Da, in a range of 175,000 to 1,500,000 Da, in a range of 200,000 to 1,500,000 Da, in a range of 225,000 to 1,500,000 Da, in a range of 250,000 to 1,500,000 Da, or in a range of 300,000 to 1,500,000 Da. The weight average molecular weight can be determined by Gel Permeation Chromatography ("GPC").

Sheath materials useful in embodiments of the present disclosure typically fall into the class of semi-crystalline polymers. Semi-crystalline polymers are able to provide robust mechanical properties even at relatively low molecular weights. Thus, suitable semi-crystalline sheath materials may have a weight average molecular weight (Mw) as low as 100,000 g/mol and still provide the toughness and elongation that is necessary to form a stable filament spool. However, higher molecular weight polymers generally result in lower MFI values, thus making higher Mw polymers preferred. Thus, the sheath Mw is generally in excess of 150,000, in excess of 200,000, in excess of 300,000, in excess of 400,000, or even in excess of 500,000 g/mol.

Other monomeric materials having multiple (meth)acryloyl groups can be combined with the curable (meth)acrylate copolymer. These monomers can be added to adjust the crosslink density of the cured (meth)acrylate copolymer. That is, these monomers are usually added to the curable (meth)acrylate copolymer after it has been formed. These monomers can react with pendant (meth)acryloyl groups of the curable (meth)acrylate copolymers when exposed to ultraviolet or visible light radiation in the presence of a photoinitiator. If added, the amount of these monomeric materials is typically in the range of 0 to 30 parts per hundred ("pph") based on the weight of the curable (meth) acrylate copolymer. For example, the amount can be at least 1 pph, at least 2 pph, or at least 5 pph and can be up to 30 pph, up to 25 pph, up to 20 pph, up to 15 pph, or up to 10 pph.

Example monomers with two (meth)acryloyl groups include 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate (e.g., commercially available from Sartomer under the trade designation SR-210, SR-252, and SR-603), polypropylene glycol diacrylate, polyethylene/polypropylene copolymer diacrylate, neopentylglycol hydroxypivalate diacrylate modified caprolactone, and polyurethane diacrylates (e.g., commercially available from Sartomer under the trade designation CN9018 and CN983).

Exemplary monomers with three or four (meth)acryloyl groups include, but are not limited to, trimethylolpropane triacrylate (e.g., commercially available under the trade designation TMPTA-N from Surface Specialties, Smyrna, Ga., and under the trade designation SR-351 from Sartomer, Exton, Pa.), pentaerythritol triacrylate (e.g., commercially available under the trade designation SR-444 from Sartomer), tris(2-hydroxyethylisocyanurate) triacrylate (commercially available under the trade designation SR-368 from Sartomer), a mixture of pentaerythritol triacrylate and pentaerythritol tetraacrylate (e.g., commercially available from Surface Specialties under the trade designation PETIA with an approximately 1:1 ratio of tetraacrylate to triacrylate, and under the trade designation PETA-K with an approximately 3:1 ratio of tetraacrylate to triacrylate), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). An exemplary crosslinker with five (meth)acryloyl groups includes, but is not limited to, dipentaerythritol pentaacrylate (e.g., commercially available under the trade designation SR-399 from Sartomer).

The curable (meth)acrylate copolymer is typically tacky (i.e., the curable (meth)acrylate copolymer is tacky prior to curing with ultraviolet or visible light radiation; in many cases, the cured (meth)acrylate copolymer is also tacky). If desired, tackifiers can be added to the curable (meth)acrylate copolymer (or to a mixture of the monomers prior to formation of the curable (meth)acrylate copolymer). Useful tackifiers include, for example, rosin ester resins, aromatic hydrocarbon resins, aliphatic hydrocarbon resins, and terpene resins. In general, light-colored tackifiers selected from hydrogenated rosin esters, hydrogenated terpenes, or hydrogenated aromatic hydrocarbon resins are preferred.

Low molecular weight (e.g., a weight average molecular weight of 100,000 Da or less as determined by gel permeation chromatography (GPC)) and high glass transition temperature (e.g., greater than 30° C.) polymers derived from (meth)acrylates can be combined with the (meth) acrylate copolymer. Suitable low molecular weight polymers are described, for example, in U.S. Pat. No. 6,783,850 (Takizawa et al.), U.S. Pat. No. 6,448,339 (Tomita), U.S. Pat. No. 4,912,169 (Whitmire et al.), and U.S. Pat. No. 6,939,911 (Tosaki et al.). These polymers can function as tackifiers.

The tackifier is typically selected to be miscible with the (meth)acrylate copolymer. Either solid or liquid tackifiers can be added. Solid tackifiers generally have a number average molecular weight (Mn) of 10,000 grams per mole or less and a softening point above about 70° C. Liquid tackifiers are viscous materials that have a softening point of about 0° C. to about 70° C.

Suitable tackifying resins include rosin resins such as rosin acids and their derivatives (e.g., rosin esters); terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the pressure-sensitive adhesive composition. Combinations of various tackifiers can be used, if desired. In many embodiments, the tackifier is a rosin ester or includes a rosin ester.

Tackifiers that are rosin esters are the reaction products of various rosin acids and alcohols. These include, but are not limited to, methyl esters of rosin acids, triethylene glycol esters of rosin acids, glycerol esters of rosin acids, and pentaertythritol esters of rosin acids. These rosin esters can be hydrogenated partially or fully to improve stability and reduce their color contribution to the pressure sensitive adhesive composition. The rosin resin tackifiers are commercially available, for example, from Eastman Chemical Company (Kingsport, Tenn., USA) under the trade designations PERMALYN, STAYBELITE, and FORAL as well as from Newport Industries (London, England) under the trade designations NUROZ and NUTAC. A fully hydrogenated rosin resin is commercially available, for example, from Eastman Chemical Company under the trade designation FORAL AX-E. A partially hydrogenated rosin resin is commercially available, for example, from Eastman Chemical Company under the trade designation STAYBELITE-E Plasticizers may also be used to adjust the rheology of the adhesive composition. The plasticizers may be non-reactive compounds such as phosphate, adipate, and phthalate esters. Various low glass transition temperature (e.g., lower than 0° C.), lower molecular weight (e.g., a Mw less than 100,000 Daltons as determined by GPC) acrylic polymers, prepared similarly to the acrylic tackifiers described above can also be used as plasticizers.

Other optional additives include, for example, antioxidants, UV stabilizers, UV absorbers, pigments, curing agents, ionic crosslinkers, antiblock agents, and polymer additives. These other optional additives can be selected, if desired, so that they do not significantly reduce the optical clarity or other desirable performance attributes of the adhesive composition.

Ionic crosslinkers that may be useful in embodiments of the present disclosure include, for example, zinc oxide, zinc rosinate (also called "resinate"), zinc stearate, sodium acetate, and 2EHA/DMAEMA (40/60) copolymer prepared as described in U.S. Pat. No. 5,986,011 (Ellis et al.)

Anti-blocking agents are particularly useful for outer layers of polyethylene to prevent sticking or blocking between layers of polyethylene when the extruded film is wound onto a roll. Useful materials include diatomaceous earth either by itself or in a low density polyethylene binder. Anti-blocking agents may be included in amounts of from about 1% to about 20% by weight of the polyethylene resin, and preferably in amounts of from about 3% to about 8%. A particularly useful anti-block agent is: POLYFIL ABC 5000, available from Polyfil Coporation, Rockaway, N.J.

The curable (meth)acrylate copolymer (or a curable adhesive containing the curable (meth)acrylate copolymer) can be cured to form a cured (meth)acrylate (or a cured adhesive containing the cured (meth)acrylate copolymer). In some embodiments, a curable (meth)acrylate copolymer or the curable adhesive composition may be in the form of a layer (e.g., film) that can be stored or transported for later curing by a customer. That is, the hydrogen bonding within the curable (meth)acrylate copolymer adds cohesive strength to the curable (meth)acrylate copolymer (or to the curable adhesive composition). This cohesive strength enhances the dimensional stability of the filament and reduces the tendency to flow if the temperature is close to room temperature or less than 40° C.

The curable (meth)acrylate copolymer and/or the associated curable adhesive compositions combine the properties of high flowability needed during hot melt processing (e.g., typically carried out at elevated temperature such as 100° C. to 200° C., or preferably 150° C. to 175° C.), and the dimensional stability and the cohesive strength needed for storage and/or transport of the filament to the end user (typically at temperatures in a range of about room temperature to less than 65° C.). The cohesive strength allows for film-like behavior at room temperature while retaining highly viscous character (and thus low elasticity and short stress relaxation times) at the elevated temperature used for hot melt dispensing. Advantageously, the adhesive filaments can have good dimensional stability when stored at room temperature and do not require refrigeration to maintain dimensional stability.

Method of Printing and Curing

A method of printing and curing a hot-melt processable adhesive is provided. The method includes forming a core-sheath filament as described above. The method further includes melting the core-sheath filament and blending the sheath with the core to form a molten composition. The method still further includes dispensing the molten composition through a nozzle onto a substrate. The molten composition can be formed before reaching the nozzle, can be formed by mixing in the nozzle, or can be formed during dispensing through the nozzle, or a combination thereof. Preferably, the sheath composition is uniformly blended throughout the core composition. The method further includes curing the molten composition after it is dispensed on a substrate with exposure to actinic radiation, i.e., UV and/or visible light.

Fused filament fabrication ("FFF"), which is also known under the trade designation "FUSED DEPOSITION MODELING" from Stratasys, Inc., Eden Prairie, Minn., is a process that uses a thermoplastic strand fed through a hot can to produce a molten aliquot of material from an extrusion head. The extrusion head extrudes a bead of material in 3D space as called for by a plan or drawing (e.g., a computer aided drawing ("CAD") file). The extrusion head typically lays down material in layers, and after the material is deposited, it fuses.

One suitable method for printing a core-sheath filament comprising an adhesive onto a substrate is a continuous non-pumped filament fed dispensing unit. In such a method, the dispensing throughput is regulated by a linear feed rate of the core-sheath filament allowed into the dispense head. In most currently commercially available FFF dispensing heads, an unheated filament is mechanically pushed into a heated zone, which provides sufficient force to push the filament out of a nozzle. A variation of this approach is to incorporate a conveying screw in the heated zone, which acts to pull in a filament from a spool and also to create pressure to dispense the material through a nozzle. Although addition of the conveying screw into the dispense head adds cost and complexity, it does allow for increased throughput, as well as the opportunity for a desired level of component mixing and/or blending. A characteristic of filament fed dispensing is that it is a true continuous method, with only a short segment of filament in the dispense head at any given point.

There can be several benefits to filament fed dispensing methods compared to traditional hot-melt adhesive deposition methods. First, filament fed dispensing methods typically permits quicker changeover to different adhesives. Also, these methods do not use a semi-batch mode with melting tanks and this minimizes the opportunity for thermal degradation of an adhesive and associated defects in the deposited adhesive. Filament fed dispensing methods can use materials with higher melt viscosity, which affords an adhesive bead that can be deposited with greater geometric precision and stability without requiring a separate curing or crosslinking step. In addition, higher molecular weight raw materials can be used within the adhesive because of the higher allowable melt viscosity. This is advantageous because uncured hot-melt pressure sensitive adhesives containing higher molecular weight raw materials can have significantly improved high temperature holding power while maintaining stress dissipation capabilities.

The form factor for FFF filaments is usually a concern. For instance, consistent cross-sectional shape and longest cross-sectional distance (e.g., diameter) assist in cross-compatibility of the core-sheath filaments with existing standardized FFF filaments such as ABS or polylactic acid ("PLA"). In addition, consistent longest cross-section distance (e.g., diameter) helps to ensure the proper throughput of adhesive because the FFF dispense rate is generally determined by the feed rate of the linear length of a filament. Suitable longest cross-sectional distance variation of the core-sheath filament according to at least certain embodiments when used in FFF includes a maximum variation of 20 percent over a length of 50 cm, or even a maximum variation of 15 percent over a length of 50 cm.

Extrusion-based layered deposition systems (e.g., fused filament fabrication systems) are useful for making articles including printed adhesives in methods of the present disclosure. Deposition systems having various extrusion types of are commercially available, including single screw extruders, twin screw extruders, hot-end extruders (e.g., for filament feed systems), and direct drive hot-end extruders (e.g., for elastomeric filament feed systems). The deposition systems can also have different motion types for the deposition of a material, including using XYZ stages, gantry cranes, and robot arms. Common manufacturers of additive manufacturing deposition systems include Stratasys, Ultimaker, MakerBot, Airwolf, WASP, MarkForged, Prusa, Lulzbot, BigRep, Cosin Additive, and Cincinnati Incorporated. Suitable commercially available deposition systems include for instance and without limitation, BAAM, with a pellet fed screw extruder and a gantry style motion type, available from Cincinnati Incorporated (Harrison, Ohio); BETABRAM Model P1, with a pressurized paste extruder and a gantry style motion type, available from Interelab d.o.o. (Senovo, Slovenia); AM1, with either a pellet fed screw extruder or a gear driven filament extruder as well as a XYZ stages motion type, available from Cosine Additive Inc. (Houston, Tex.); KUKA robots, with robot arm motion type, available from KUKA (Sterling Heights, Mich.); and AXIOM, with a gear driven filament extruder and XYZ stages motion type, available from AirWolf 3D (Fountain Valley, Calif.).

Three-dimensional articles including a printed adhesive can be made, for example, from computer-aided drafting ("CAD") models in a layer-by-layer manner by extruding a molten adhesive onto a substrate. Movement of the extrusion head with respect to the substrate onto which the adhesive is extruded is performed under computer control, in accordance with build data that represents the final article. The build data is obtained by initially slicing the CAD model of a three-dimensional article into multiple horizontally sliced layers. Then, for each sliced layer, the host computer generates a build path for depositing roads of the composition to form the three-dimensional article having a printed adhesive thereon. In select embodiments, the printed adhesive comprises at least one groove formed on a surface of the printed adhesive. Optionally, the printed adhesive forms a discontinuous pattern on the substrate.

The substrate onto which the molten adhesive is deposited is not particularly limited. In many embodiments, the substrate comprises a polymeric part, a glass part, or a metal part. Use of additive manufacturing to print an adhesive on a substrate may be especially advantageous when the substrate has a non-planar surface, for instance a substrate having an irregular or complex surface topography.

The core-sheath filament can be extruded through a nozzle carried by an extrusion head and deposited as a sequence of roads on a substrate in an x-y plane. The extruded molten adhesive fuses to previously deposited molten adhesive as it solidifies upon a drop-in temperature. This can provide at least a portion of the printed adhesive. The position of the extrusion head relative to the substrate is then incremented along a z-axis (perpendicular to the x-y plane), and the process is repeated to form at least a second layer of the molten adhesive on at least a portion of the first layer. Changing the position of the extrusion head relative to the deposited layers may be carried out, for example, by lowering the substrate onto which the layers are deposited. The process can be repeated as many times as necessary to form a three-dimensional article including a printed adhesive resembling the CAD model. Further details can be found, for example, Turner, B. N. et al., "A review of melt extrusion additive manufacturing processes: I. process design and modeling"; Rapid Prototyping Journal 20/3 (2014) 192-204. In certain embodiments, the printed adhesive comprises an integral shape that varies in thickness in an axis normal to the substrate. This is particularly advantageous in instances where a shape of adhesive is desired that cannot be formed using die cutting of an adhesive. In some embodiments, it may be desirable to apply only a single adhesive layer as it may be advantageous, for example, to minimize material use and/or reduce the size of the final bond line.

A variety of fused filament fabrication 3D printers may be useful for carrying out the method according to the present disclosure. Many of these are commercially available under the trade designation "FDM" from Stratasys, Inc., Eden Prairie, Minn., and subsidiaries thereof. Desktop 3D printers for idea and design development and larger printers for direct digital manufacturing can be obtained from Stratasys and its subsidiaries, for example, under the trade designations "MAKERBOT REPLICATOR", "UPRINT", "MOJO", "DIMENSION", and "FORTUS". Other 3D printers for fused filament fabrication are commercially available from, for example, 3D Systems, Rock Hill, S.C., and Airwolf 3D, Costa Mesa, Calif.

In certain embodiments, the method further comprises mixing the molten composition (e.g., mechanically) prior to dispensing the molten composition. In other embodiments, the process of being melted in and dispensed through the nozzle may provide sufficient mixing of the composition such that the molten composition is mixed in the nozzle, during dispensing through the nozzle, or both.

The temperature of the substrate onto which the adhesive can be deposited may also be adjusted to promote the fusing of the deposited adhesive. In the method according to the present disclosure, the temperature of the substrate may be, for example, at least about 100° C., 110° C., 120° C., 130° C., or 140° C. up to 175° C. or 150° C.

The methods by which the dispensed adhesive may be cured are not particularly limited. The adhesive may be cured with any actinic radiation by methods know to those of ordinary skill in the relevant arts. Suitable LED light sources include for example and without limitation, Phoseon, 365 nm UV-LED Model FJ100 (available from Phoseon Technology Hillsboro, Oreg.). Suitable mercury light sources include for example, Light Hammer LHC10

Mark2 fusion lamp system (available from Heraeus Noblelight America LLC Gaithersburg, Md.) equipped with a D-bulb. While many light sources are available, the duration of exposure is only restricted by the final dose in Joules/cm² received by the adhesive. For example, a LED source may have a power output of 6 W/cm², so we would only need a few hundred milliseconds of cure time to achieve the desired dose of 500 mJ/cm2. In some embodiments, the cured adhesive composition may be formed after less than 10 seconds exposure, less than 5 seconds exposure, or less than 2 seconds exposure to ultraviolet or visible light radiation.

The printed adhesive prepared by the method according to the present disclosure may be an article useful in a variety of industries, for example, the aerospace, apparel, architecture, automotive, business machines products, consumer, defense, dental, electronics, educational institutions, heavy equipment, jewelry, medical, and toys industries. The composition of the sheath and the core can be selected so that, if desired, the printed adhesive is clear.

SELECT EMBODIMENTS OF THE PRESENT DISCLOSURE

In a first embodiment, provided is a core-sheath filament comprising:
 a non-tacky sheath, wherein the non-tacky sheath exhibits a melt flow index of less than 15 grams per 10 minutes (g/10 min); and
 a curable adhesive composition comprising (1) a curable (meth)acrylate copolymer having a weight average molecular weight in a range of 100,000 to 1,500,000 Da and (2) an optional photoinitiator, wherein the curable (meth)acrylate copolymer comprises:
 a) a first monomeric unit of Formula (I) in an amount in a range of 50 to 99 weight percent based on a total weight of monomeric units in the curable (meth)acrylate copolymer

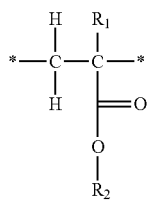

(I)

wherein
 $R_1$ is hydrogen or methyl; and
 $R_2$ is an alkyl, heteroalkyl, aryl, aralkyl, or alkaryl group;
 b) a second monomeric unit of Formula (II) in an amount in a range of 1 to 13 weight percent based on the total weight of monomeric units in the curable (meth)acrylate copolymer

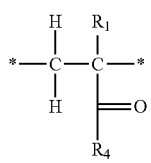

(II)

wherein
 $R_1$ is hydrogen or methyl; and
 $R_4$ is —OH, —NH₂, a secondary amino group, a tertiary amino group, an (N,N— dialkylaminoalkyl)-O— group, (N,N-dialkylaminoalkyl)-N— group; and
 c) a third monomeric unit of Formula (III) in an amount in a range of 0.05 to 5 weight percent based on the total weight of monomeric units of the curable (meth)acrylate copolymer

(III)

wherein
 $R_3$ comprises 1) an aromatic ketone group that causes hydrogen abstraction from a polymeric chain when exposed to ultraviolet radiation or 2) a (meth)acryloyl group that undergoes free radical polymerization in the presence of the photoinitiator when exposed to ultraviolet or visible light radiation.

In a second embodiment provided is the core-sheath filament of the first embodiment, wherein the non-tacky sheath comprises a polymer selected from the group consisting of a (meth)acrylic block copolymer, an ethylene methyl copolymer, and combinations thereof.

In a third embodiment provided is the core-sheath filament of the first embodiment or the second embodiment, wherein 1 to 10 percent of the longest cross-sectional distance of the core-sheath filament is the sheath and 90 to 99 percent of the longest cross-sectional distance of the core-sheath filament is the core.

In a fourth embodiment provided is the core-sheath filament of any one of the first through the third embodiments, wherein the curable (meth)acrylate copolymer has a weight average molecular weight in a range of 200 kDa to 1500 kDa.

In a fifth embodiment provided is the core-sheath filament of any one of the first through the fourth embodiments, wherein the curable adhesive composition further comprises an ionic crosslinking additive.

In a sixth embodiment provided is the core-sheath filament of any one of the first through the fifth embodiments, the cured adhesive composition being a reaction product resulting from exposing the core-sheath filament to ultraviolet or visible light radiation after compounding the core-sheath filament through a heated extruder nozzle.

In a seventh embodiment provided is the core-sheath filament of the sixth embodiment, wherein the cured adhesive composition exhibits a creep resistance of greater than 3 MPa-s, greater than 5 MPa-s, or greater than 8 MPa-s when tested according to the Creep Resistance Test Method.

In an eighth embodiment provided is the core-sheath filament of the sixth embodiment or the seventh embodiment, wherein the cured adhesive composition can maintain 1 kg of shear at room temperature on a 323 mm² stainless steel panel for at least 100 minutes, at least 1000 minutes, or at least 5000 minutes.

In a ninth embodiment provided is the core-sheath filament of any one of the sixth through eighth embodiments, wherein the cured adhesive composition exhibits at least 30 N/cm peel adhesion to stainless steel when tested according to the 180° Peel Test Method.

In a tenth embodiment provided is the core-sheath filament of any one of the sixth through the ninth embodiments, wherein the cured adhesive composition is formed after less than 10 seconds exposure, less than 5 seconds exposure, or less than 2 seconds exposure to ultraviolet or visible light radiation.

In an eleventh embodiment provided is an article comprising a first substrate, a second substrate, and a layer of the cured adhesive composition of any one of the sixth through the tenth embodiments, wherein the layer of the cured adhesive composition is positioned between the first substrate and the second substrate.

In a twelfth embodiment provided is a method of making a core-sheath filament, the method comprising:

a) forming a core composition comprising the curable adhesive composition of the first embodiment;

b) forming a sheath composition comprising a non-tacky thermoplastic material; and c) wrapping the sheath composition around the core composition the core-sheath filament, wherein the core-sheath filament has an average longest cross-sectional distance in a range of 1 to 20 millimeters.

In a thirteenth embodiment provided is the method of the twelfth embodiment, wherein the wrapping the sheath composition around the core composition comprises co-extruding the core composition and the sheath composition such that the sheath composition surrounds the core composition.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Mo., or may be synthesized by known methods. The following abbreviations are used in this section: min=minutes, s=second, g=gram, mg=milligram, kg=kilogram, m=meter, centimeter= cm, mm=millimeter, μm=micrometer or micron, ° C.= degrees Celsius, ° F.=degrees Fahrenheit, N=Newton, oz=ounce, Pa=Pascal, MPa=mega Pascal, rpm=revolutions per minute, phh=parts per hundred, psi=pressure per square inch, cc/rev=cubic centimeters per revolution, $cm^3$= centimeters cubed Table 1 (below) lists materials used in the examples and their sources.

TABLE 1

Material List

| DESIGNATION | DESCRIPTION |
| --- | --- |
| ELVALOY 1224 | Ethylene and 24% Methyl Acrylate Copolymer, obtained under the trade designation "ELVALOY 1224 AC" from Dow, Inc., Midland, MI |
| BYNEL 21E533 | Anhydride Modified Ethylene Acrylate, obtained under the trade designation "BYNEL 21E533" from Dow, Inc., Midland, MI |
| BYNEL 30E753 | Anhydride Modified Ethylene Vinyl Acetate, obtained under the trade designation "BYNEL 30E753" from Dow, Inc., Midland, MI |
| ELVALOY 1609 | Ethylene and 9% Methyl Acrylate Copolymer, obtained under the trade designation "ELVALOY 1609 AC" from Dow, Inc., Midland, MI |
| NUCREL 3990 | Ethylene-Acrylic Acid Copolymer (9 wt % AA), obtained under the trade designation "NUCREL 3990" from Dow, Inc., Midland, MI |
| ELVALOY 1330 | Ethylene Methyl Acrylate, obtained under the trade designation "ELVALOY AC 1330" from Dow, Inc., Midland, MI |
| LDPE | Low Density Polyethylene, obtained under the trade designation "PETROTHENE NA217000" from Lyondell Bassell, Houston, TX |
| ELVALOY 3135 | Ethylene-Vinyl Acetate Copolymer (12 wt % VA), obtained under the trade designation "ELVAX 3135 SB" from Dow, Inc., Midland, MI |
| LA2250 | PMMA-b-PnBA-b-PMMA A-B-A type block co-polymer (~30 wt % PMMA), obtained under the trade designation "KURARITY LA2250" from Kuraray Chiyoda-ku, Tokyo, JP |
| LA4285 | PMMA-b-PnBA-b-PMMA A-B-A type block co-polymer (~50 wt % PMMA), obtained under the trade designation "KURARITY LA4285" from Kuraray Chiyoda-ku, Tokyo, JP |
| IOA | Isooctyl acrylate, obtained from Sigma-Aldrich, St. Louis, MO |
| AA | Acrylic acid, obtained from Sigma-Aldrich, St. Louis, MO |
| IOTG | Iso-octyl thioglycolate, obtained from Evans Chemetics, Teaneck, NJ |
| VAZO 52 | (2,2'-azobis(2,4-dimethylpentanenitrile), obtained under the trade designation "VAZO 52" from DuPont, Wilmington, DE |
| VAZO 64 | (2,2'-azobis(isobutyronitrile), obtained under the trade designation "VAZO 64" from DuPont, Wilmington, DE |
| VAZO 67 | (2,2'-azobis(2-methylbutanenitrile), obtained under the trade designation "VAZO 67" from DuPont, Wilmington, DE |
| VAZO 88 | 1,1'-azobis(cyclohexanecarbonitrile), obtained under the trade designation "VAZO 88" from DuPont, Wilmington, DE |
| LUPERSOL 101 | 2,5-bis(tert-butylperoxy)-2,5-dimethylhexane, obtained under the trade designation "LUPERSOL 101" from Arkema, Inc., Philadelphia, PA |
| LUPERSOL 130 | 2,5-Dimethyl-2,5-di-(tert-butylperoxy)-3-hexyne, obtained under the trade designation "LUPERSOL 130" from Arkema, Inc., Philadelphia, PA |

TABLE 1-continued

Material List

| DESIGNATION | DESCRIPTION |
|---|---|
| IRGANOX 1010 | Pentaerythritoltetrakis(3-(3,5-ditertbutyl-4-hydroxyphenyl)propionate), obtained under the trade designation "IRGANOX 1010" from BASF Corporation, Florham Park, NJ |
| AeBP | Acryloylethoxy benzophenone, a copolymerizable monomer containing a separately photoreactive group; Prepared using a method similar to that described in U.S. Pat. No. 7,838,110 B2 (Zhu et al.) |
| MEHQ | Hydroquinone monomethyl ether, a polymerization inhibitor; Sigma-Aldrich (St. Louis, MO, USA) |
| MEK | Methyl ethyl ketone; Sigma-Aldrich (St. Louis, MO, USA) |
| Loparex 7350/7300 | Double-coated PET Silicone release liner available from Loparex; (Hammond, WI, USA) |
| SKYROL SH-81 | SKYROL SH-81, an optically clear polyester film having a thickness of 0.025 millimeters; SKC, Inc. (Atlanta, GA, USA) |
| ZnSt | Zinc stearate from Alfa Aesar (City, State) |
| POLYFIL ABC 5000 | Polyfil Coporation, Rockaway, New Jersey |
| Float Glass | Northwestern Glass (Fridley, MN) |
| EAGLE XG | CORNING EAGLE XG alkaline earth boro-aluminosilicate glass from Delta Technologies, Limited (Loveland, CO) |

Test Procedures

Melt Flow Index Test Method for all Samples

Melt flow index (MFI) was conducted on all samples following the method set forth in ASTM D1238-13 (*Standard Test Method for Melt Flow Rates of Thermoplastics by Extrusion Platometer*, latest revision in 2013), Procedure A. The equipment used was a Tinius Olsen MP 987 Extrusion Plastometer (Melt Indexer), with the standard die dimensions for Procedure A. Conditions for the test were a temperature of 190° C. and a weight of 2.16 kg. A total of 8-19 replicates were performed to determine statistics, namely average MFI (in units of g/10 minutes), standard deviation of the MFI, and the 95% confidence interval about the mean.

Melt Flow Index Literature Method

The MFI literature method was reported as ASTM D1238-13 with a 2.16 kg load and measured at 190° C. and it is expected that those values are directly comparable to the tested MFI values reported in Table 4 in the Results section below.

Method for Calculating Melt Flow Index of Polymer Blend from Homopolymer Melt Flow Index The MFI of a polymer blend can be approximated as:

$$\log(MFI_{Final}) = X_1 * \log(MFI_1) + X_2 * \log(MFI_2)$$

where $X_1$ and $X_2$ are the weight fractions of each polymer $X_i$ and the $MFI_1$ and $MFI_2$ are the melt flow indices of the virgin polymers MFI. The results of such calculations are shown below in Table 2.

TABLE 2

MFI Approximations

| Blend | Polymer 1 | Polymer 2 | MFI Polymer 1 | MFI Polymer 2 | X1 | X2 | New MFI |
|---|---|---|---|---|---|---|---|
| 50/50 | LA2250 | LA4285 | 22.7 | 1.84 | 0.5 | 0.5 | 6.46 |
| 67/33 | LA2250 | LA4285 | 22.7 | 1.84 | 0.67 | 0.33 | 9.91 |

Creep Resistance Test Method

The examples were analyzed using a DHR-3 parallel plate rheometer equipped with a Peltier plate accessory (TA Instruments, New Castle, Del., USA) to characterize the creep properties of each sample as a function of time. Rheology samples were formed into an adhesive film approximately 1 mm thick between silicone coated release liners. Samples were then punched out with an 8 mm circular die, removed from the release liners, centered onto the 8 mm diameter parallel plate upper fixture of the rheometer, and compressed down to the Peltier plate until the edges of the sample were uniform with the edges of the top plate.

Samples were conditioned at the test start temperature of 25° C. under an axial force control of 40 g with a sensitivity of +/−30 g for 120 seconds and then the axial force adjustment was disabled to hold the plates at a fixed gap for the remainder of the test. A fixed stress of 8,000 Pa was then applied for 1860 seconds. While many physical parameters of the material are recorded during the creep test, Compliance (J) is of primary importance in the characterization of the copolymers of this invention.

The Creep Resistance of the polymer is a term used to describe the long-time creep behavior of the material by measuring the slope of the compliance versus time and inverting that value to yield a viscosity (Pa-s). It is calculated at the completion of the test by extracting the compliance values at about 20 minutes (1199.5 seconds) and about 30 minutes (1795.1 seconds) according to the following formula:

Creep Resistance=[(Compliance(1/Pa) at 1795s−Compliance(1/Pa) at 1199s)÷(1795s−1199s)]^−1

Shear Strength Test Method

Shear tests were conducted using 12.7 mm wide adhesive tapes prepared in the examples. A stainless steel ("SS") panel was cleaned by wiping (first with heptane and then with acetone) and drying. Tapes were applied to the panel such that a 12.7 mm by 25.4 mm portion of each adhesive tape was in firm contact with the panel and the trailing end portion of each tape was free (i.e. not attached to the panel). The panel with tape was held in a rack so that the panel formed an angle of 180° with the extended free end and a 1 kg weight was attached to the free end. The test was conducted under controlled temperature and humidity conditions (72° F. 50% relative humidity) and the time elapsed for each tape to separate from the test panel was recorded as the shear strength in minutes. Three shear tests were performed for each adhesive sample and the results averaged.

D-Bulb Curing Method

PSA film samples were cured at room temperature using a Light Hammer LHC10 Mark2 fusion lamp system (available from Heraeus Noblelight America LLC Gaithersburg, Md.) equipped with a D-bulb. The UV dose was measured using an EIT UV Power Puck II (available from EIT, Sterling, Va.) in the UV-B range and the line speed was adjusted to achieve the desired dose of 500 mJ/cm$^2$ UV-B. The adhesive was then cured open-faced under these optimized conditions.

180° SS Peel Test Method

Peel adhesion force was measured using tapes prepared as described below. A stainless steel ("SS") panel was cleaned by wiping (first with heptane and then with acetone) and drying. Tapes measuring 12.7 mm wide by 10 to 12 cm long were adhered to the panel by rolling with a 2 kg hard rubber roller 2 times. The free end of the adhesive strip was doubled back so that the angle of removal was 180° and attached to the horizontal arm of an adhesion tester scale (Slip/peel tester, obtained from Instrumentors Inc. Strongsville, Ohio, USA). The stainless-steel panel was attached to the platform that moved at 12 inches/minute (30.5 cm/minute) away from the scale. The peel test was started 20 minutes after the tape was applied to the test panel allowing dwell time for the adhesive to build. The first 2 seconds of each measurement was discarded and the average of the peel forces during the next 5 seconds of peel testing was recorded in ounces per width of the adhesive tape sample (oz/0.5 in). Three peel tests were run for each sample and averaged to yield the peel force value reported in N/cm.

180° Glass Peel Test Method

Peel adhesion was also tested on the air side of float glass panels (sometimes referred to as soda lime glass) purchased from Northwestern Glass (Fridley, Minn.). The samples were tested following the same procedure as for the SS panels. Three peel tests were run for each sample and averaged to yield the peel force value reported in N/cm.

Optical Haze Test

Haze measurements were measured using a spectrophotometer in transmission mode (Ultrascan PRO Spectrophotometer, available from Hunter Association Laboratory Incorporated, Reston, Va., USA). Approximately 150 micron thick adhesive samples coated between release coated carrier liners were cut to approximately 5 cm length by 10 cm length. One of the carrier liners was removed and the sample was laminated to a clear piece of 69.2 mm×123.2 mm×0.5 mm EAGLE XG glass using hand pressure and insuring no air bubbles got trapped. The other liner was then removed and a 1 mil layer of optically clear PET (Obtained under the trade designation "SKYROL SH-81" from SKC, Inc. (Atlanta, Ga., USA) was laminated onto the adhesive. The sample was placed in the UltrascanPro Spectrophotometer (obtained from HunterLab, Reston, Va.) to measure transmission though the PET/OCA/glass assembly.

All core compositions, Core 1 to Core 6 (C1 to C6), are summarized in Table 2 with preparations described below.

Core 1 (C1) Synthesis: Preparation of Core to be Used in Examples 1-3 (EX1-EX3), Examples 6-13 (EX6-EX13), and Comparative Example 1 (CE1)

The following components were added to a 1.8 liter stainless steel reactor: 900.0 grams IOA, 100.0 grams AA, 0.99 grams of AeBP, 1.0 grams IRGANOX 1010 antioxidant, 0.76 grams IOTG, 0.006 grams VAZO 52, and 0.2 grams MEHQ. The mixture was heated, while stirring, to 60° C. The reactor was purged of oxygen while heating and pressurized with 5 psi of nitrogen gas before reaching the induction temperature of 60° C. The polymerization reaction proceeded under adiabatic conditions to a peak reaction temperature of 121° C. The mixture was cooled to 60° C. and 0.228 grams of IOTG, 0.0375 grams of VAZO 52 and 1.25 grams of AeBP were added. The reactor was purged of oxygen and pressurized with 5 psi of nitrogen gas. The polymerization reaction proceeded under adiabatic conditions to a peak reaction temperature of 145° C. The mixture was cooled to 110° C. and 0.2 grams VAZO 88, 0.03 grams Lupersol 101, and 0.375 grams of AeBP were added. The reactor was purged of oxygen and pressurized with 5 psi of nitrogen gas. The polymerization reaction proceeded under adiabatic conditions to a peak reaction temperature of 155° C.

Core 2 (C2) Synthesis

Material for Core 2 was prepared as described in Synthesis Example 51 of U.S. Pat Pub. 2013/0184394 (Satrijo et al.) except that the composition was as follows: 29.7 parts 2EHA, 51 parts BA, 18.5 parts MA, 0.8 parts AA, 0.38 pph ABP, 0.15 pph of IRGACURE 651, 0.4 pph IRGANOX 176, and 0.030 pph IOTG. Amounts as weight percent composition are also shown in Table 3. Preparation of core to be used in Example 4 (EX4).

Core 3 (C3) Synthesis

Core 3 was prepared the same as Core 2 but using the amounts shown in Table 2. Preparation of core to be used in Example 5 (EX5)

Core 4 (C4) Synthesis

Core 4 was prepared the same as Core 2 but using the amounts shown in Table 2. Preparation of core to be used in Examples 14-15 (EX14-15)

Core 5 (C5) Synthesis

Core 5 was prepared the same as Core 2 but using the amounts shown in Table 2. Preparation of core to be used in Examples 16-17 (EX16-17)

Core 6 (C6) Synthesis

Core 6 was prepared the same as Core 2 but using the amounts shown in Table 2. Preparation of core to be used in Examples 18-20 (EX18-20).

TABLE 3

Core (C1-C6) Compositions

| Sample | Wt % Components | | | | | | | VAZO 52 | IRGANOX 1010 | IRGACURE IOTG | IRGANOX 651 | IRGANOX 1076 | MEHQ | VAZO 88 | LUPERSOL 101 |
| --- | --- | --- | --- | --- | --- | --- | --- | --- | --- | --- | --- | --- | --- | --- | --- |
| | IOA | 2EHA | BA | MA | AA | ABP | AeBP | | | | | | | | |
| C1 | 89.55 | 0 | 0 | 0 | 9.95 | 0 | 0.26 | 0.006 | 0.10 | 0.10 | 0 | 0 | 0.02 | 0.02 | 0.003 |
| C2 | 0 | 29.42 | 50.52 | 18.32 | 0.79 | 0.38 | 0 | 0 | 0 | 0.03 | 0.15 | 0.40 | 0 | 0 | 0 |
| C3 | 0 | 0 | 94.47 | 0 | 4.97 | 0.18 | 0 | 0 | 0 | 0.03 | 0.15 | 0.2 | 0 | 0 | 0 |
| C4 | 90 | 0 | 0 | 0 | 10 | 0 | 0 | 0 | 0 | 0.03 | 0.15 | 0.4 | 0 | 0 | 0 |
| C5 | 43 | 0 | 45 | 0 | 12 | 0 | 0 | 0 | 0 | 0.06 | 0.15 | 0.4 | 0 | 0 | 0 |
| C6 | 0 | 95 | 0 | 0 | 5 | 0.15 | 0 | 0 | 0 | 0.03 | 0.15 | 0.2 | 0 | 0 | 0 |

Examples 1-20 (EX1-E20) and Comparative Examples 1-5 (CE1-CE5) are summarized in Table 4 with preparations described below.

Core-Sheath Filament Preparation Method 1: Examples 6-9 (EX6-EX9)

Core-sheath filaments were made by co-extruding a non-tacky outer sheath layer around an inner PSA core, with the example compositions described in Table 4 below. For all samples, the PSA core was compounded at 200 rpm using an 18 mm co-rotating twin screw extruder (available from Coperian GmbH (Stuttgart, Germany)) with all zones heated between 160° C. and 170° C. The PSA core was fed as cut slabs into a 50.8 mm single screw extruder (available from The Bonnot Company (Akron, Ohio)) and the melt stream was metered using a 3 cc/rev gear-pump (available from Colfax Corporation (Annapolis Junction, Md.)). The non-tacky outer sheath was melted and extruded using a 19.1 mm single screw extruder (HAAKE brand, available from Thermo Fisher Scientific (Waltham, Mass.)). Both melt streams were fed into a co-axial die having a ~12 mm exit diameter, similar to the die described in U.S. Pat. No. 7,773,834 (Ouderkirk et al). The PSA was fed into the inner core layer of the coaxial die, while the non-tacky sheath material was fed into the outer sheath of the die; ultimately producing a core-sheath filament. The filament was drawn to 8 mm final diameter through a water bath at room temperature (22° C.). The filaments were wound onto 75 mm diameter tubes for storage.

Core-Sheath Filament Preparation Method 2: Examples 18-20 (EX18-EX20) and Comparative Examples 2-5 (CE2-CE5)

Core-sheath filaments were made by co-extruding a non-tacky outer sheath layer around an inner PSA core, with the example compositions described in Table 4 below. For all samples, the PSA core was compounded at 200 rpm using a 25 mm co-rotating twin screw extruder (available from KrausMaffei Berstorff GmbH (Munich, Germany)) with all zones heated between 160° C. and 170° C. The PSA core was fed into a 50.8 mm single screw extruder (available from The Bonnot Company (Akron, Ohio)) and the melt stream was metered using a 3 cc/rev gear-pump (available from Colfax Corporation (Annapolis Junction, Md.)). The non-tacky outer sheath was melted and extruded using a 19.1 mm single screw extruder (Killion brand, now available from Davis Standard (Pawcatuck, N.J.)). Both melt streams were fed into a co-axial die having a ~12 mm exit diameter, similar to the die described in U.S. Pat. No. 7,773,834 (Ouderkirk et al). The PSA was fed into the inner core layer of the coaxial die, while the non-tacky sheath material was fed into the outer sheath of the die; ultimately producing a core-sheath filament. The filament was drawn to 8 mm final diameter through a water bath at room temperature (22° C.). The filaments were wound onto 75 mm diameter tubes for storage.

Core-Sheath Filament Preparation Method 2: Examples 1-5 (EX1-EX5) and Examples 10-13 (EX10-EX13)

Films of non-tacky sheaths were prepared by hot melt pressing pellets of LPDE (or other film formers) to average thickness of 7-10 mils (0.1778-0.254 mm) in a Model 4389 hot press (Carver, Inc., Wabash) at 140° C. (284° F.). Rectangles of film 1.5 inch (3.77 cm) in width and 2.7-5.9 inch (7-15 cm) in length were cut and hand rolled to encircle a hot melt PSA formulation to yield a core/sheath filament 12 mm in diameter.

Core-Sheath Filament Compounding: Examples 6-9 (EX6-EX9), Examples 18-20 (EX18-EX20), and Comparative Examples 2-5 (CE2-CE5)

The batch preparation of core-sheath filament adhesives was carried out using an Intelli-Torque Plasti-corder unit (obtained from Brabender GmbH & Co. KG Kulturstraße 49-55 47051 Duisburg) equipped with an electrically heated three-part mixer with a capacity of approximately 55 cm³ and high shear counter-rotating blades. The mixer was preheated to 150° C. and set at a mixing speed of 60 rpm and the core/sheath filament was added directly to the top of the mixing barrel as three separate filaments totaling 50 g. The mixing operation was run for 5 minutes, at which time the mixture appeared homogeneous and transparent. After removal from the mixer, the bulk material was dissolved in MEK at 50% solids, coated onto silicone release liner under a notch bar set at a 12 mil (0.3048 mm) gap, and dried at 70° C. for 20 minutes.

Core-Sheath Filament Extrusion: Examples 6-9 (EX6-EX9), Examples 18-20 (EX18-EX20), and Comparative Examples 2-5 (CE2-CE5)

The extruded core-sheath filament compositions were compounded using a ZE30R co-rotating twin screw extruder (obtained from KraussMaffei Berstorff, Hanover, Germany), and subjected to 220 rpm mixing for 3 minutes. A Nordson Xaloy 042709 gear pump turned at 20 rpm to pump the molten adhesive through a heated hose and die. The die had a 1 mm gap and 101 mm width. The extruder, hose, and die temperatures were set to 182° C. The PSA was extruded onto a 0.075 mm thick polyester liner with differential silicone release layers and rolled up until used for testing. The polyester liner was drawn across the die at 244 mm/min, to produce an adhesive thickness of 1 mm.

TABLE 4

Example (EX1-EX 13 and EX18-EX20) and Comparative Example (CE1-CE5) Compositions

| Ex. # | Filament Prep. Method | Core | Core Additives ZnSt pph | Tackifier pph | Sheath | Sheath Additives |
|---|---|---|---|---|---|---|
| CE1 | None | C1 | 0.0 | 0.0 | None | None |
| EX1 | 2 | C1 | 0.0 | 0.0 | LA2250 | None |
| EX2 | 2 | C1 | 0.0 | 0.0 | LA4285 | None |
| EX3 | 2 | C1 | 0.0 | 0.0 | 50% LA2250/50% LA4285 | None |
| EX4 | 2 | C2 | 0.0 | 0.0 | 50% LA2250/50% LA4285 | None |
| EX5 | 2 | C3 | 0.0 | 0.0 | 50% LA2250/50% LA4285 | None |
| EX6 | 1 | C1 | 1.0 | 0.0 | Elvaloy 1224 | None |
| EX7 | 1 | C1 | 2.0 | 0.0 | Elvaloy 1224 | None |
| EX8 | 1 | C1 | 3.0 | 0.0 | Elvaloy 1224 | None |
| EX9 | 1 | C1 | 3.0 | 0.0 | 67% LA2250/33% LA4285 | None |
| EX10 | 2 | C1 | 0.0 | 0.0 | Bynel 21E533 | None |
| EX11 | 2 | C1 | 0.0 | 0.0 | Bynel 30E753 | None |
| EX12 | 2 | C1 | 0.0 | 0.0 | Elvaloy 1609 | None |
| EX13 | 2 | C1 | 0.0 | 0.0 | Elvax 3135 EVA | None |
| CE2 | 1 | C4 | 1.0 | 0.0 | 50% LA2250/50% LA4285 | None |
| CE3 | 1 | C4 | 1.0 | 10 pph | 50% LA2250/50% LA4285 | None |
| CE4 | 1 | C5 | 0.0 | 0.0 | 50% LA2250/50% LA4285 | 10% Anti-block |
| CE5 | 1 | C5 | 0.5 | 0.0 | Elvaloy 1330 | 10% Anti-block |
| EX18 | 1 | C6 | 0.0 | 0.0 | Elvaloy 1330 | 10% Anti-block |
| EX19 | 1 | C6 | 0.0 | 15 pph | Elvaloy 1330 | 10% Anti-block |
| EX20 | 1 | C6 | 1.0 | 15 pph | Elvaloy 1330 | 10% Anti-block |

Results
Melt Flow Index Values for Sheath Materials

Table 5 shows the results of melt flow index values of sheath materials used in EX1-EX20 and CE1.

TABLE 5

Melt Flow Index Values of Sheath Materials

| Sheath | MFI Method | MFI (g/10 min) |
|---|---|---|
| Elvaloy 1224 | Literature | 2.0 |
| Bynel 21E533 | Literature | 7.3 |
| Bynel 30E753 | Literature | 2.1 |
| Elvaloy 1609 | Literature | 6.0 |
| Nucrel 3990 | Literature | 10.0 |
| Elvaloy 1330 | Literature | 3.0 |
| NA217000 LDPE | Literature | 5.6 |
| Elvax 3135 SB | Literature | 0.4 |
| LA2250 | Tested | 22.7 |
| LA4285 | Tested | 1.8 |
| 50/50 LA2250/LA4285 Blend | Calculated | 6.5 |
| 67/33 LA2250/LA 4285 Blend | Calculated | 9.9 |

Creep Resistance for Core-Sheath Filament Materials

Table 6 shows the results of Creep Resistance of core-sheath materials used in EX1-EX20 and CE1.

TABLE 6

Creep Resistance and Dimensional Stability of Core-Sheath Filament Materials

| Examples | Creep Resistance (MPa-s) |
|---|---|
| CE1 | 0.4 |
| EX4 | 0.1 |
| EX5 | 0.0 |
| EX6 | 1.1 |
| EX7 | 2.2 |
| EX8 | 3.4 |
| EX9 | 16.0 |
| CE2 | 22.6 |
| CE3 | 15.5 |
| CE4 | 45.1 |
| CE5 | 33.7 |
| EX18 | 8.3 |
| EX19 | 1.7 |
| EX20 | 5.1 |

Compounded Core-Sheath Filament PSA Performance

Table 7 shows the testing results for Shear Stress, 180 Degree Peel, and Optical Haze for the core-sheath materials used in EX1-EXEX20 and CE1. (EX6 and EX7 excluded due to unfavorable stability test results.

TABLE 7

Compounded Filament PSA Performance

| Sample | SS Peel (N/cm) | Glass Peel (N/cm) | SS Shear (min) | Post UV SS Shear (min) | % Haze |
|---|---|---|---|---|---|
| CE1 | 5.9 | 6.0 | 73 | 10,000 | 2.0 |
| EX1 | 6.2 | 7.0 | 79 | 10,000 | 2.9 |
| EX2 | 5.7 | 7.2 | 88 | 10,000 | 10.8 |
| EX3 | 6.0 | 7.5 | 88 | 10,000 | 5.8 |
| EX4 | 3.8 | 3.7 | 8 | 10,000 | 3.7 |
| EX5 | 7.0 | 7.1 | 8 | 10,000 | 3.1 |
| EX8 | 6.0 | 5.4 | 289 | 6,967 | NT |
| EX9 | 5.9 | 4.7 | 100 | 6,530 | NT |
| EX10 | 6.5 | 7.5 | 58 | 10,000 | 32.2 |
| EX11 | 6.6 | 7.2 | 1 | 10,000 | 23.3 |
| EX12 | 6.5 | 6.7 | 102 | 10,000 | 63.3 |
| EX13 | 6.5 | 6.3 | 62 | 10,000 | 65.8 |
| CE2 | 11.2 | 11.8 | 534 | N/A* | NT** |
| CE3 | 8.8 | 8.9 | 1059 | N/A | NT |
| CE4 | 13.5 | 11.6 | 594 | N/A | NT |
| CE5 | 5.7 | 5.7 | 362 | N/A | NT |
| EX18 | 6.2 | 6.7 | 17 | 5,919 | NT |

TABLE 7-continued

Compounded Filament PSA Performance

| Sample | SS Peel (N/cm) | Glass Peel (N/cm) | SS Shear (min) | Post UV SS Shear (min) | % Haze |
|---|---|---|---|---|---|
| EX19 | 6.5 | 6.5 | 15 | 10,000 | NT |
| EX20 | 7.1 | 7.1 | 83 | 10,000 | NT |

*N/A means "not applicable" as the samples were hand rolled cigars, not co-extruded filaments
**NT means "not tested"

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A core-sheath filament comprising:

a non-tacky sheath, wherein the non-tacky thermoplastic sheath exhibits a melt flow index of less than 15 grams per 10 minutes (g/10 min) when measured in accord with ASTM D1238 at 190° C.; and a curable adhesive composition comprising (1) a curable (meth)acrylate copolymer having a weight average molecular weight in a range of 100,000 to 1,500,000 Da and (2) an optional photoinitiator, wherein the curable (meth)acrylate copolymer comprises:

a) a first monomeric unit of Formula (I) in an amount in a range of 50 to 99 weight percent based on a total weight of monomeric units in the curable (meth)acrylate copolymer

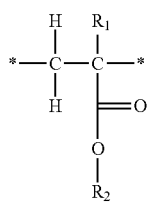

(I)

wherein $R_1$ is hydrogen or methyl; and $R_2$ is an alkyl, heteroalkyl, aryl, aralkyl, or alkaryl group;

b) a second monomeric unit of Formula (II) in an amount in a range of 1 to 13 weight percent based on the total weight of monomeric units in the curable (meth)acrylate copolymer

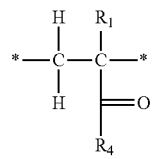

(II)

wherein $R_1$ is hydrogen or methyl; and $R_4$ is —OH, —NH$_2$, a secondary amino group, a tertiary amino group, an (N,N-dialkylaminoalkyl)-O— group, (N,N-dialkylaminoalkyl)-N— group; and c) a third monomeric unit of Formula (III) in an amount in a range of 0.05 to 5 weight percent based on the total weight of monomeric units of the curable (meth)acrylate copolymer

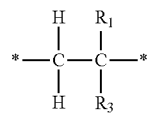

(III)

wherein $R_3$ comprises 1) an aromatic ketone group that causes hydrogen abstraction from a polymeric chain when exposed to ultraviolet radiation or 2) a (meth)acryloyl group that undergoes free radical polymerization in the presence of the photoinitiator when exposed to ultraviolet or visible light radiation.

2. The core-sheath filament of claim 1, wherein the non-tacky sheath comprises a polymer selected from the group consisting of a (meth)acrylic block copolymer, an ethylene methyl copolymer, and combinations thereof.

3. The core-sheath filament of claim 1, wherein 1 to 10 percent of the longest cross-sectional distance of the core-sheath filament is the sheath and 90 to 99 percent of the longest cross-sectional distance of the core-sheath filament is the core.

4. The core-sheath filament of claim 1, wherein the curable (meth)acrylate copolymer has a weight average molecular weight in a range of 200 kDa to 1500 kDa.

5. The core-sheath filament of claim 1, wherein the curable adhesive composition further comprises an ionic crosslinking additive.

6. A method of making a core-sheath filament, the method comprising:

a) forming a core composition comprising the curable adhesive composition of claim 1;

b) forming a sheath composition comprising the non-tacky thermoplastic material of claim 1; and c) wrapping the sheath composition around the core composition the core-sheath filament, wherein the core-sheath filament has an average longest cross-sectional distance in a range of 1 to 20 millimeters.

7. The method of claim 6, wherein the wrapping the sheath composition around the core composition comprises co-extruding the core composition and the sheath composition such that the sheath composition surrounds the core composition.

* * * * *